(12) United States Patent
Wu

(10) Patent No.: US 11,803,712 B2
(45) Date of Patent: Oct. 31, 2023

(54) METHOD FOR BURNING ADDRESS CODE OF LED LAMP BEADS

(71) Applicant: Yuan Wu, Guangdong (CN)

(72) Inventor: Yuan Wu, Guangdong (CN)

(73) Assignee: Yuan Wu, Meizhou (CN)

( * ) Notice: Subject to any disclaimer, the term of this patent is extended or adjusted under 35 U.S.C. 154(b) by 0 days.

(21) Appl. No.: 17/833,849

(22) Filed: Jun. 6, 2022

(65) Prior Publication Data

US 2023/0011578 A1  Jan. 12, 2023

Related U.S. Application Data

(63) Continuation of application No. PCT/CN2020/133831, filed on Dec. 4, 2020, and a continuation of application No. PCT/CN2020/133835, filed on Dec. 4, 2020.

(30) Foreign Application Priority Data

Dec. 6, 2019 (CN) .......................... 201911240623.5
Dec. 6, 2019 (CN) .......................... 201911241228.9

(51) Int. Cl.
  *G06K 1/12* (2006.01)
(52) U.S. Cl.
  CPC .................................. *G06K 1/126* (2013.01)
(58) Field of Classification Search
  CPC .............................. G06K 1/126; H05B 47/175
  USPC ....................................................... 235/494
  See application file for complete search history.

(56) References Cited

U.S. PATENT DOCUMENTS

| 2012/0212155 A1 | 8/2012 | Cheng-Lung et al. |
| 2013/0026945 A1* | 1/2013 | Ganick ............. H05B 47/16 315/246 |
| 2017/0094745 A1 | 3/2017 | Lai et al. |

(Continued)

FOREIGN PATENT DOCUMENTS

| CN | 101246432 A | 8/2008 |
| CN | 203377885 A | 1/2014 |
| CN | 104184845 A | 12/2014 |

(Continued)

OTHER PUBLICATIONS

International Search Report of PCT/CN2020/133831.

(Continued)

*Primary Examiner* — Toan C Ly
(74) *Attorney, Agent, or Firm* — Dragon Sun Law Firm, PC; Nathaniel Perkins

(57) ABSTRACT

The present disclosure provides a method and control apparatus for burning an address code of LED lamp beads, and relates to the technical field of LEDs. The method for burning the address code of the LED lamp beads described by the present disclosure is applied to a burner and includes: generating, by the burner, an optical signal; and sending the optical signal to the LED lamp beads such that the LED lamp beads sense the optical signal, convert the optical signal into an address code and store the address code. The present disclosure makes use of a light sensing effect of the LED lamp beads, sends the optical signal to the LED lamp beads through the burner such that the LED lamp beads generate an address code according to the optical signal, and burn the address code into the LED lamp beads.

19 Claims, 24 Drawing Sheets

```
┌─────────────────────────────────────────┐
│ Power on a burner, and establish an    │
│ optical communication connection with   │──── S101
│ LED lamp beads                          │
└─────────────────────────────────────────┘
                    ▼
┌─────────────────────────────────────────┐
│ Generate, by the burner, an optical    │
│ signal, and send the optical signal to │
│ the LED lamp beads such that the LED   │──── S102
│ lamp beads sense the optical signal    │
│ and convert the optical signal into an │
│ address code                            │
└─────────────────────────────────────────┘
                    ▼
┌─────────────────────────────────────────┐
│ Send, by the burner, a burning         │
│ instruction to the LED lamp beads such │──── S103
│ that the address code is stored in the │
│ LED lamp beads                          │
└─────────────────────────────────────────┘
```

(56) References Cited

U.S. PATENT DOCUMENTS

2019/0373696 A1* 12/2019 Peng ................ H05B 45/20

FOREIGN PATENT DOCUMENTS

| | | | |
|---|---|---|---|
| CN | 105307326 | A | 2/2016 |
| CN | 109027736 | A | 12/2018 |
| CN | 109041321 | A | 12/2018 |
| CN | 109152140 | A | 1/2019 |
| CN | 109345803 | A | 2/2019 |
| CN | 110990031 | A | 4/2020 |
| CN | 110996443 | A | 4/2020 |
| CN | 211240168 | U | 8/2020 |
| JP | 2003324782 | A | 11/2003 |

OTHER PUBLICATIONS

Written Opinion of PCT/CN2020/133831.
International Search Report of PCT/CN2020/133835.
Written Opinion of PCT/CN2020/133835.

* cited by examiner

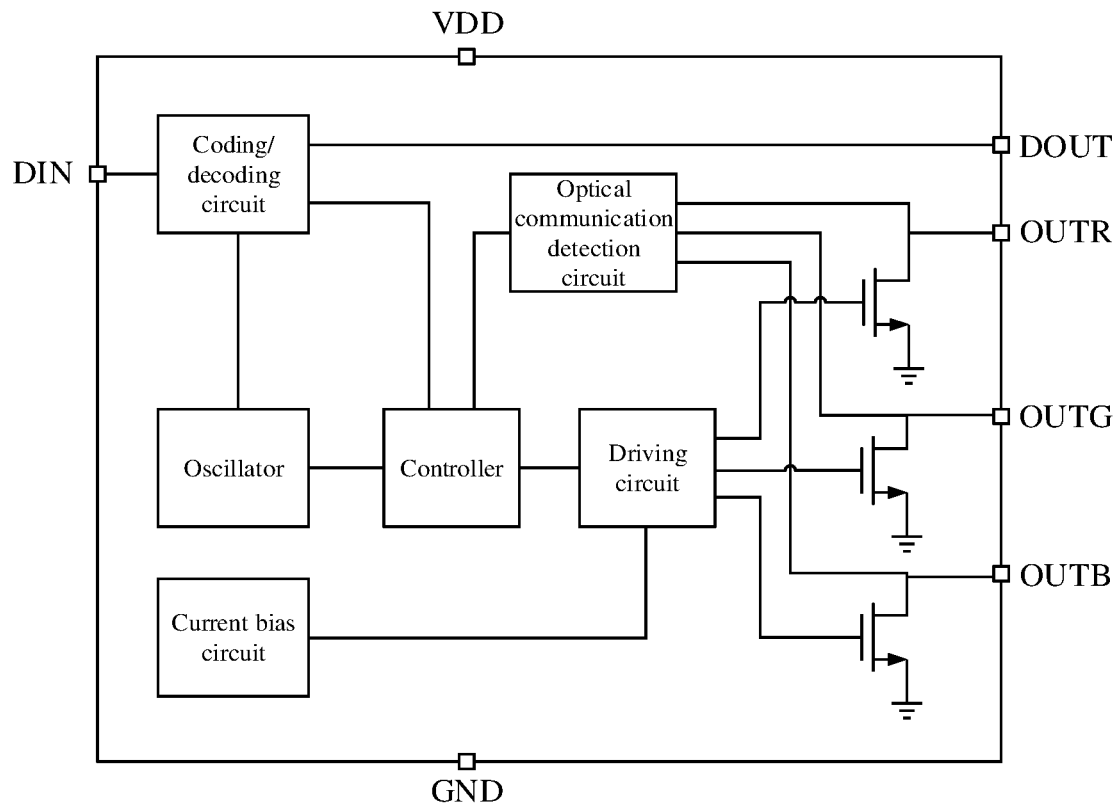

Fig. 15

Enter a random code mode, and obtain, by each LED lamp bead, a randomly generated random code — ST101

Send, by the LED lamp beads, the random code to a burner so as to determine, in the burner, a permanent address code corresponding to the random code and a burning instruction including the random code and the permanent address code — ST102

Enter a burning mode, and receive, by the LED lamp beads, the burning instruction, perform addressing according to the random code, and store the permanent address code — ST103

Fig. 16

METHOD FOR BURNING ADDRESS CODE OF LED LAMP BEADS

CROSS REFERENCE TO RELATED APPLICATIONS

The present disclosure claims priorities from the PCT Application Nos.: PCT/CN2020/133831 and PCT/CN2020/133835, filed on Dec. 4, 2020, the Chinese Patent Application No. 201911241228.9 entitled "METHOD AND APPARATUS FOR BURNING ADDRESS CODE OF LED LAMP BEADS", and the Chinese Patent Application No. 201911240623.5 entitled "METHOD AND APPARATUS FOR BURNING ADDRESS CODE OF LED LAMP BEADS", both filed to China National Intellectual Property Administration (CNIPA) on Dec. 6, 2019, the entire contents of which are incorporated herein by reference.

TECHNICAL FIELD

The present disclosure relates to the technical field of LED lamp beads, in particular to a method for burning an address code of LED lamp beads.

BACKGROUND

Generally, LED lamp beads are widely used in various light-emitting devices because of their characteristics such as a long life, zero pollution, and a high luminous efficiency. At present, address codes of the LED lamp beads are burnt before the LED lamp beads are combined into an array. Since the address codes of the LED lamp beads are certain after burning, when an LED lamp bead is damaged and needs to be repaired and replaced, the LED lamp bead needs to be replaced with an LED lamp bead of the same address code, which leads to inconvenience in after-sales maintenance.

Typically, before the LED lamp beads are combined into a lamp bead array, the address codes of the LED lamp beads need to be burnt one by one. Since the address codes of the LED lamp beads are certain, an LED lamp bead with an address of No. 1 cannot usually be replaced with an LED lamp bead with an address of No. 100, which brings great inconvenience to subsequent maintenance and after-sales maintenance.

SUMMARY

The present disclosure solves the above problem that after-sales maintenance is inconvenient because burning must be performed before LED lamp beads are combined into an array and consequently an address code is fixed.

In order to solve the above problem, the present disclosure provides a method for burning an address code of LED lamp beads, applied to a burner, and including: generating, by the burner, an optical signal and sending the optical signal to the LED lamp beads, such that the LED lamp beads sense the optical signal, and convert the optical signal into an address code; and sending, by the burner, a burning instruction to the LED lamp beads, such that the LED lamp beads store the address code.

In this way, by making use of a light sensing effect of the LED lamp beads, the optical signal is sent to the LED lamp beads through the burner, such that the LED lamp beads generate the address code according to the optical signal and burns the address code into the LED lamp beads. The present disclosure may perform burning after the LED lamp beads are combined into a lamp strip, so a situation that because the LED lamp beads are burnt one by one before the LED lamp beads are combined into the strip, maintenance of the LED lamp beads is inconvenient is avoided.

Optionally, generating, by the burner, the optical signal includes: obtaining, by the burner, an identification code, and converting the identification code into the optical signal. The plurality of identification codes are provided, and the burner converts the different identification codes into the different optical signals, and sends the different optical signals to the different LED lamp beads.

Optionally, after generating, by the burner, the optical signal and sending the optical signal to the LED lamp beads, such that the LED lamp beads convert the optical signal into the address code, the method further includes: sending, by the burner, a check code to the LED lamp beads, such that the LED lamp beads judge whether the address code is matched with the identification code according to the check code; and generating, by the burner, the optical signal again when the address code is not matched with the identification code, and sending the optical signal to the LED lamp beads, such that the LED lamp beads convert the optical signal into the address code and cover the previous address code.

Optionally, after generating, by the burner, the optical signal and sending the optical signal to the LED lamp beads, such that the LED lamp beads convert the optical signal into the address code, the method further includes: obtaining, by the burner, the address code converted by the LED lamp beads according to the optical signal; matching, by the burner, the address code and the identification codes; and generating, by the burner, the optical signal again when the address code is not matched with the identification codes, and sending the optical signal to the LED lamp beads, such that the LED lamp beads convert the optical signal into the address code and cover the previous address code.

Optionally, the burner generates the optical signal and sends the same to the LED lamp beads, such that the LED lamp beads sense the optical signal and convert the optical signal into a temporary address code; and the burner generates a burning instruction including the temporary address code and a permanent address code corresponding to the temporary address code, and sends the burning instruction to the LED lamp beads, such that the LED lamp beads perform addressing according to the temporary address code to store the permanent address code.

The present disclosure further provides a method for burning an address code of LED lamp beads, applied to the LED lamp beads, and including: entering, by the LED lamp beads, an optical communication mode, and sensing, by the LED lamp beads, an optical signal sent by a burner and converting the optical signal into an address code; and receiving, by the LED lamp beads, a burning instruction sent by the burner, and storing the address code.

In this way, by establishing optical communication between the LED lamp beads and the burner, and by making use of a photoelectric effect that the LED lamp beads sense light, the optical signal sent by the burner is converted into the address code, and the address code is burnt into the LED lamp beads. Thus, burning of the address codes after the LED lamp beads are assembled into a lamp strip is realized, so a situation that because the LED lamp beads are burnt before being combined into the strip, the permanent address code is determined and consequently maintenance and replacement are inconvenient is avoided.

Optionally, after converting the optical signal by the burner through an identification code, and converting, by the LED lamp beads, the optical signal into the address code, the method further includes: sending, by the LED lamp beads, the address code to the burner to judge whether the address code is matched with the identification code; and when the address code is not matched with the identification code, sensing, by the LED lamp beads again, the optical signal sent by the burner, converting the optical signal into the address code, and covering the previous address code with the converted address code.

Optionally, the converting the optical signal by the burner through the identification code, further includes: receiving, by the LED lamp beads, a check code sent by the burner; judging, by the LED lamp beads, whether the address code is matched with the identification code according to a check code; and when the address code is not matched with the identification code, sensing, by the LED lamp bead again, the optical signal sent by the burner, converting the optical signal into the address code, and covering the previous address code with the converted address code.

Optionally, the LED lamp beads enter the optical communication mode, the LED lamp beads sense the optical signal sent by the burner and convert the optical signal into a temporary address code; and the LED lamp beads receive a burning instruction sent by the burner and including the temporary address code and a permanent address code corresponding to the temporary address code, perform addressing according to the temporary address code, and store the permanent address code.

The present disclosure further provides a control apparatus for burning an address code of LED lamp beads, including a non-transitory computer-readable storage medium storing a computer program. A program instruction, when being executed, implements any one of the above methods for burning the address code of the LED lamp beads.

Optionally, the apparatus further includes a driving circuit configured to generate an LED lamp bead driving signal, an optical communication detection circuit configured to detect an optoelectronic signal generated by the LED lamp beads and a port configured to be connected to the LED lamp beads, and the driving circuit and the optical communication detection circuit are respectively connected to the port.

Optionally, the optical communication detection circuit includes a first current mirror circuit, a second current mirror circuit and a comparator, an input end of the first current mirror circuit is connected to the port, an input end of the second current mirror circuit is configured to be connected to a reference current source, and an output end of the first current mirror circuit and an output end of the second current mirror circuit are both connected to the comparator.

Optionally, the first current mirror circuit includes a first transistor and a second transistor, a drain electrode of the first transistor serves as the input end of the first current mirror circuit, a gate electrode of the second transistor is respectively connected to a gate electrode and the drain electrode of the first transistor, a source electrode of the first transistor and a source electrode of the second transistor are both connected to a power source, and a drain electrode of the second transistor serves as the output end of the first current mirror circuit; and the second current mirror circuit includes a third transistor and a fourth transistor, a drain electrode of the third transistor serves as the input end of the second current mirror circuit, a gate electrode of the fourth transistor is respectively connected to a gate electrode and the drain electrode of the third transistor, a source electrode of the third transistor and a source electrode of the fourth transistor are both grounded, and a drain electrode of the fourth transistor serves as the output end of the second current mirror circuit.

Optionally, the optical communication detection circuit includes a resistor and a comparator, a first end of the resistor is respectively connected to the port and a first input end of the comparator, a second end of the resistor is connected to a power source, and a second input end of the comparator is configured to be connected to a reference voltage source.

Optionally, the optical communication detection circuit includes a resistor and an inverter, a first end of the resistor is respectively connected to the port and the inverter, and a second end of the resistor is connected to a power source.

Optionally, the optical communication detection circuit further includes a switching device, and the switching device is arranged between the port and the input end of the first current mirror circuit, or between the port and the first end of the resistor.

In addition, in order to solve the above problem, the present disclosure further provides a method for burning an address code of LED lamp beads, applied to a lamp bead array including a plurality of LED lamp beads. The method includes:

entering a random code mode, and obtaining, by each of the LED lamp beads, a randomly generated random code;

sending, by the LED lamp beads, the random code to a burner so as to determine, in the burner, a permanent address code corresponding to the random code and a burning instruction including the random code and the permanent address code; and receiving, by the LED lamp beads, the burning instruction, performing addressing according to the random code, and storing the permanent address code.

In this way, when the address code of the LED lamp beads is burnt, the LED lamp beads first obtain one random code representing a temporary address code, the random code is then sent to the burner, such that the burn determines a location of the lamp beads according to the random code, the burner packages the permanent address code and the random code and sends the same to the lamp beads, and the lamp beads perform addressing through the random code, such that the permanent address code is burnt into the LED lamp beads. According to the present disclosure, burning may be performed after the lamp beads are combined into a lamp bead array. When the LED lamp beads are damaged, the LED lamp beads may be replaced with any lamp bead of the same model and no requirement is raised for a fixed location of the LED lamp beads. Therefore, inconvenience in LED lamp bead maintenance caused by LED lamp beads at fixed locations is avoided, and one-by-one burning of the LED lamp beads in an LED lamp bead burning method is avoided, thus reducing working procedures.

Optionally, after obtaining, by each of the LED lamp beads, the randomly generated random code, the method further includes:

sending the random code to the burner, so as to perform repeated code judgment on all the random codes in the burner; and when repeated codes exist in all the random codes, receiving, by the LED lamp beads, a repeated code instruction sent by the burner, and re-obtaining the random code according to the repeated code instruction.

Optionally, the sending, by the LED lamp beads, the random code to the burner includes:

determining, by the LED lamp beads, a lamp bead on/off condition representing the random code according to the random code; and running the LED lamp beads according to the lamp bead on/off condition, such that the burner identifies the lamp bead on/off condition and converts the LED lamp bead on/off condition into the random code.

Optionally, the LED lamp beads are multi-color LED lamp beads, and the sending, by the LED lamp beads, the random code to the burner includes:

determining, by the LED lamp beads, light emitting grayscale values of light emitting chips of different colors in the LED lamp beads according to the random code; and emitting light, by the light emitting chips of the different colors, at the corresponding grayscale values, such that the burner identifies light emitting colors of the LED lamp beads and converts the light emitting colors into the random code.

Optionally, after the LED lamp beads receive the repeated code instruction sent by the burner, all the LED lamp beads re-obtain the random code, and cover the previous random code.

Optionally, the method includes entering a random code mode, and obtaining, by each of the LED lamp beads, a randomly generated random code;

determining, by the LED lamp beads, a temporary address code according to the random code;

sending, by the LED lamp beads, the temporary address code to a burner so as to determine, in the burner, a permanent address code corresponding to the temporary address code and a burning instruction including the temporary address code and the permanent address code; and receiving, by the LED lamp beads, the burning instruction, performing addressing according to the temporary address code, and storing the permanent address code.

The present disclosure further provides a method for burning an address code of LED lamp beads, applied to a burner, and including:

receiving, by the burner, a random code sent by the LED lamp beads;

determining, by the burner, a permanent address code corresponding to the random code and a burning instruction including the random code and the permanent address code; and sending, by the burner, the burning instruction to the LED lamp beads, such that the LED lamp beads perform addressing according to the random code, and burn the permanent address code into control chips of the LED lamp beads.

Optionally, receiving the random code sent by the LED lamp beads includes:

identifying, by the burner, a lamp bead on/off condition representing the random code of the LED lamp beads; and converting, by the burner, the lamp bead on/off condition into the random code.

Optionally, before sending, by the burner, the burning instruction to the LED lamp beads, the method further includes:

performing, by the burner, repeated code judgment on all the random codes; and sending, when repeated codes exist in all the random codes, a repeated code instruction to the LED lamp beads, such that the LED lamp beads re-generate the random code.

Optionally, when the repeated codes exist in all the random codes, the burner obtains the random code being the repeated code and all random codes not used, sends the random code being the repeated code and all the random codes not used to the LED lamp beads, such that the LED lamp beads with the random code being the repeated code randomly re-generate one random code from all the random codes not used and the repeated code.

The present disclosure further provides an LED lamp, including at least one LED lamp bead. The LED lamp beads include a control chip, the control chip includes a non-transitory computer-readable storage medium storing a computer program, and a program instruction, when being executed, implements any one of the above methods for burning the address code of the LED lamp beads.

Optionally, the LED lamp beads further include a random code generation circuit. The random code generation circuit includes a timer, a register, and a first oscillator and a second oscillator in different output frequencies. The first oscillator is connected to the register through the timer, and the second oscillator is connected to the register.

Optionally, the first oscillator is an RC oscillator, and the second oscillator is an inverting oscillator; or the first oscillator is the inverting oscillator, and the second oscillator is the RC oscillator.

Optionally, the RC oscillator includes a capacitor, a resistor, and four inverters connected to one another in sequence. Two ends of the capacitor are respectively connected to an input end of the first inverter and an output end of the second inverter, and two ends of the resistor are respectively connected to the input end of the first inverter and an output end of the third inverter.

Optionally, the inverting oscillator includes four inverters connected to one another in sequence, and an input end of the first inverter is connected to an output end of the third inverter.

Optionally, the inverter includes a first transistor and a second transistor. A source electrode of the first transistor is connected to a power source, a source electrode of the second transistor is grounded, a gate electrode of the first transistor and a gate electrode of the second transistor are connected as the input end of the inverter, and a drain electrode of the first transistor and a drain electrode of the second transistor are connected as the output end of the inverter.

BRIEF DESCRIPTION OF THE DRAWINGS

FIG. 15 is a schematic circuit diagram of an LED control apparatus in an embodiment of the present disclosure.

DESCRIPTION OF REFERENCE NUMERALS IN FIG. 1 TO FIG. 15

11—producing unit, 12—sending unit, 13—obtaining unit, 14—judging unit, 15—generating unit, 21—sensing unit, 22—converting unit, 23—receiving unit, and 24—storing unit.

FIG. 16 is a flow chart of a method for burning an address code of LED lamp beads in an embodiment of the present disclosure.

Figure 17:
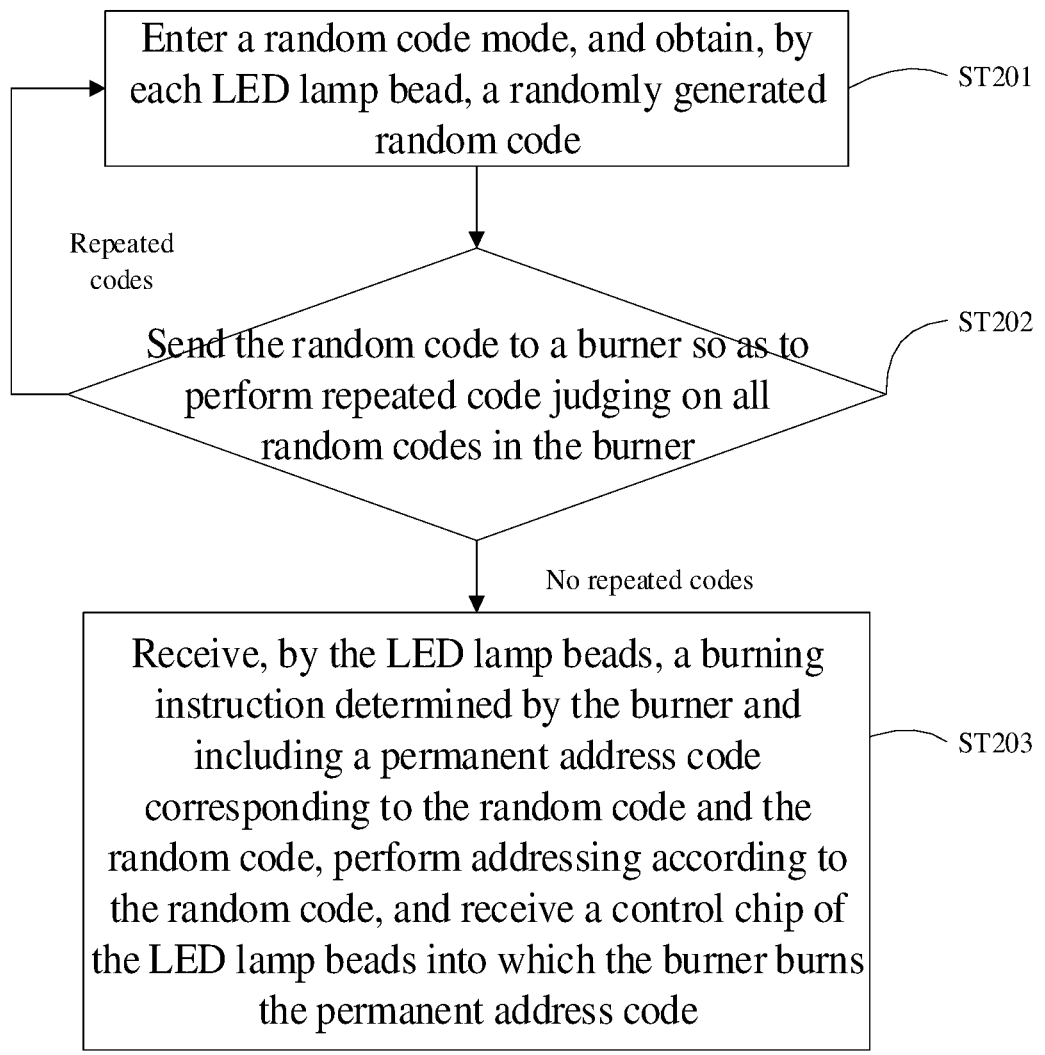

FIG. 17 is a flow chart of repeated code judgment in a method for burning an address code of LED lamp beads in an embodiment of the present disclosure.

Figure 18:
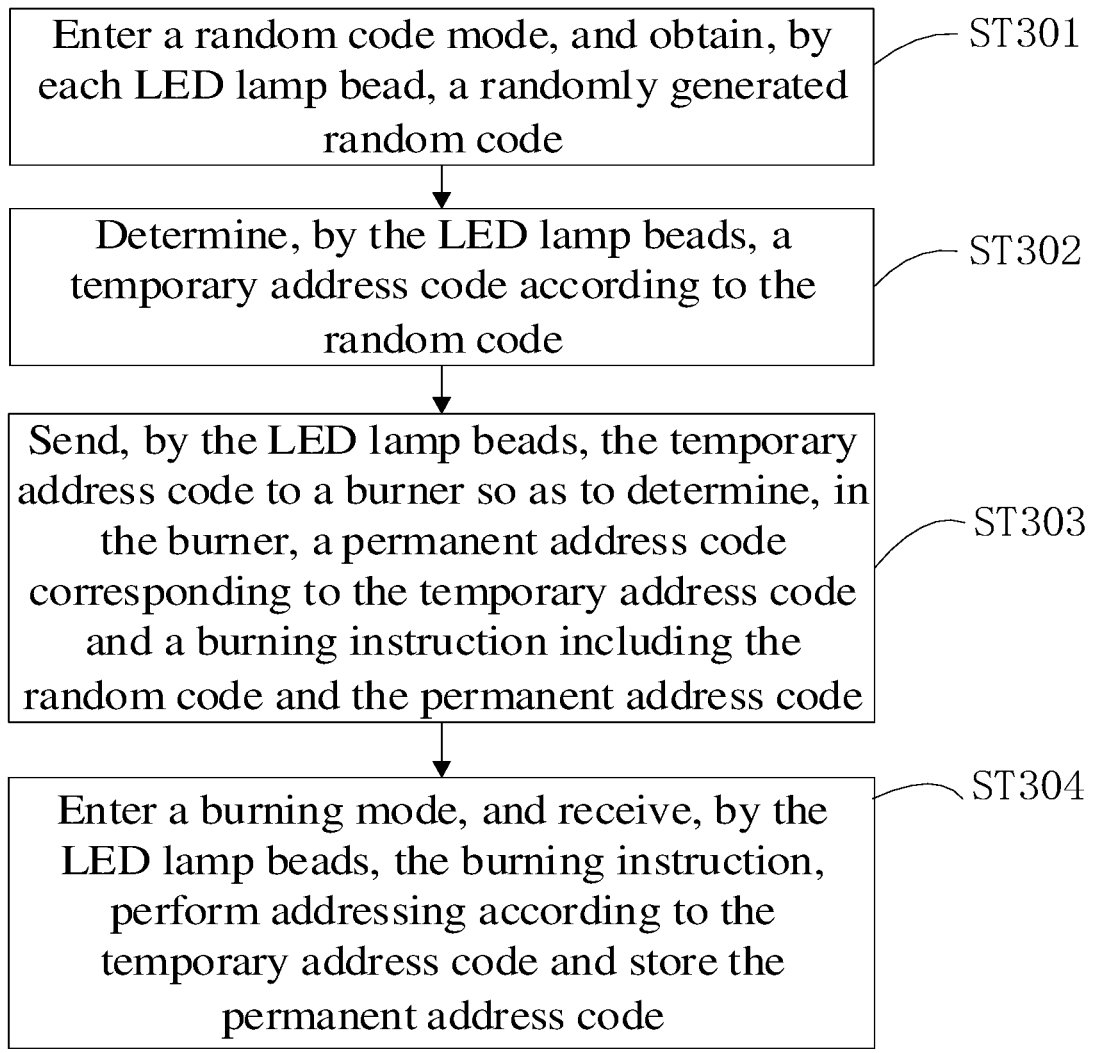

FIG. 18 is a flow chart of a method for burning an address code of LED lamp beads in an embodiment of the present disclosure.

Figure 19:
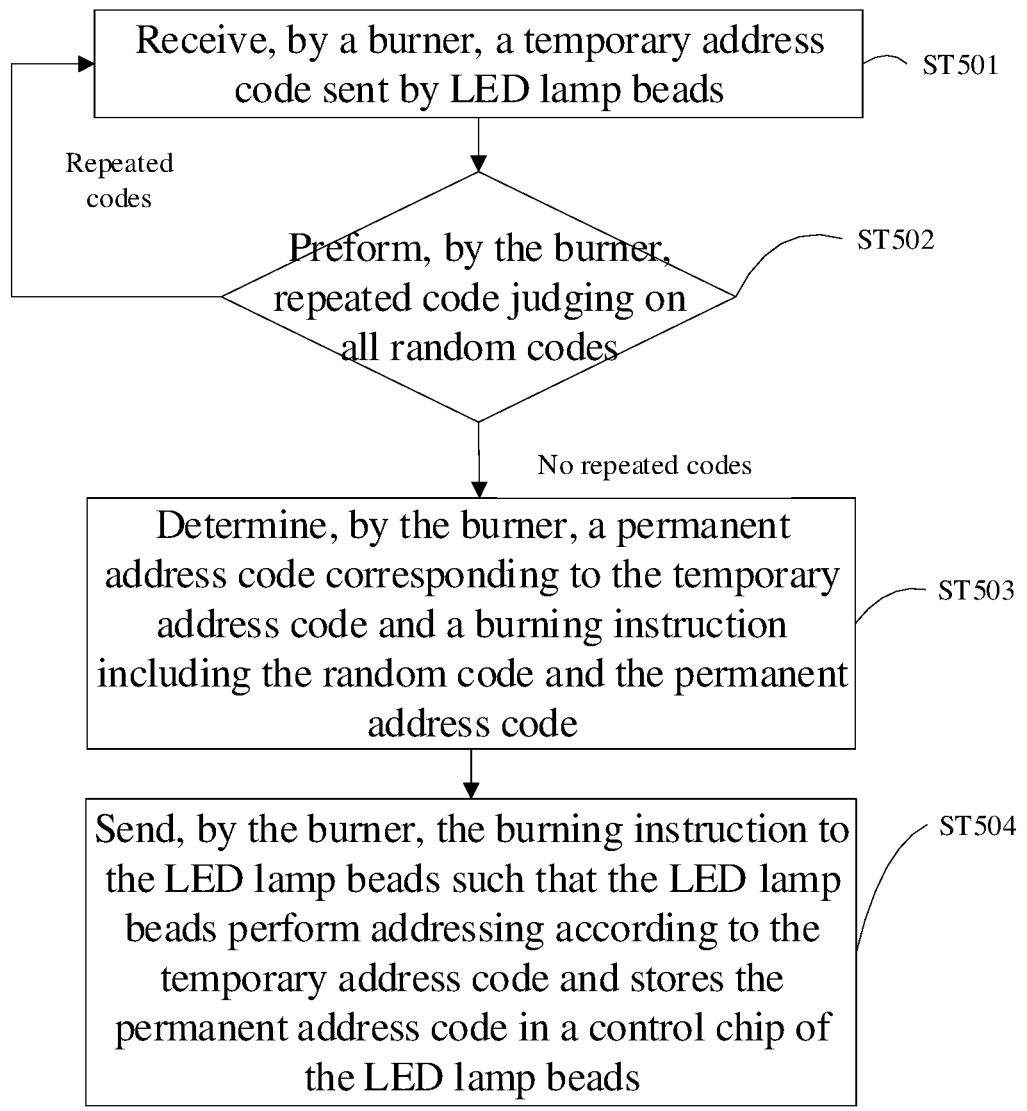

FIG. 19 is a flow chart of repeated code judgment in a method for burning an address code of LED lamp beads in an embodiment of the present disclosure.

Figure 20:
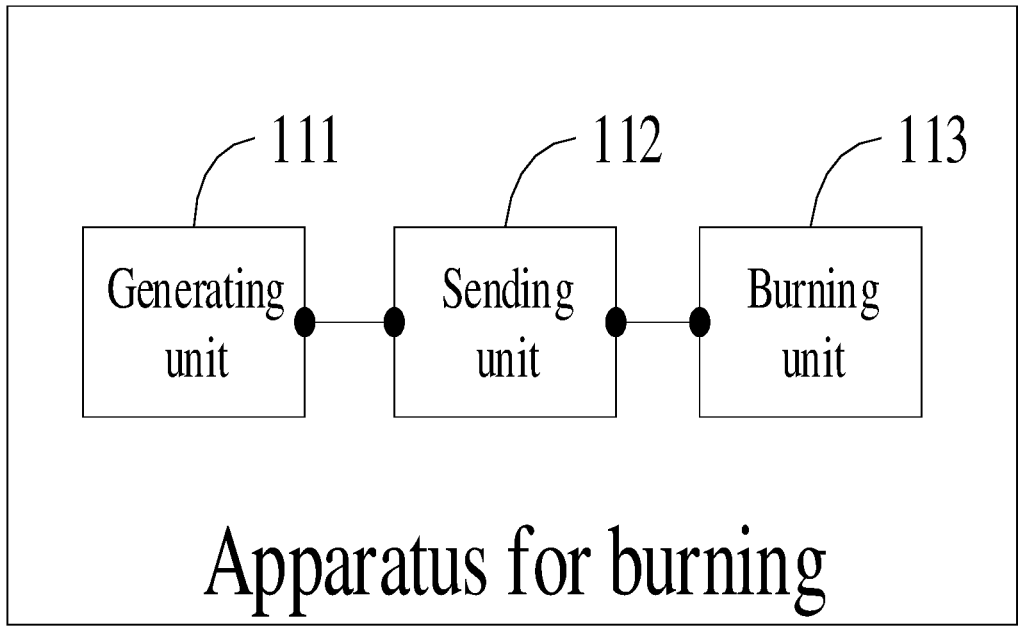

FIG. 20 is a schematic diagram of an apparatus for burning an address code of LED lamp beads in an embodiment of the present disclosure.

Figure 21:
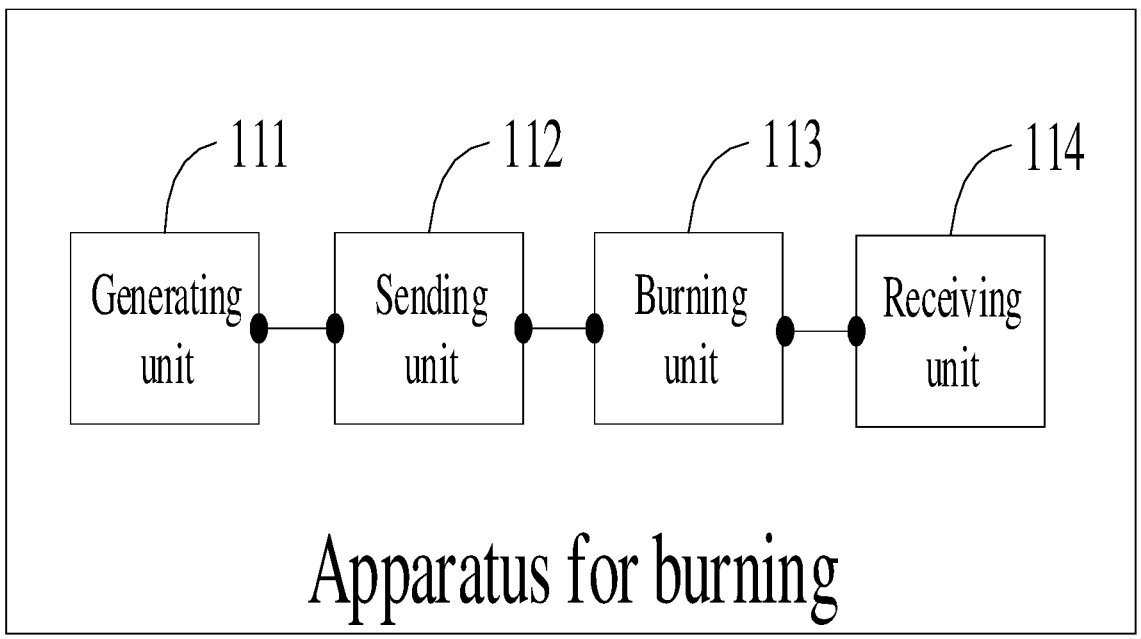

FIG. 21 is a schematic diagram of an apparatus for burning an address code of LED lamp beads in an embodiment of the present disclosure.

Figure 22:
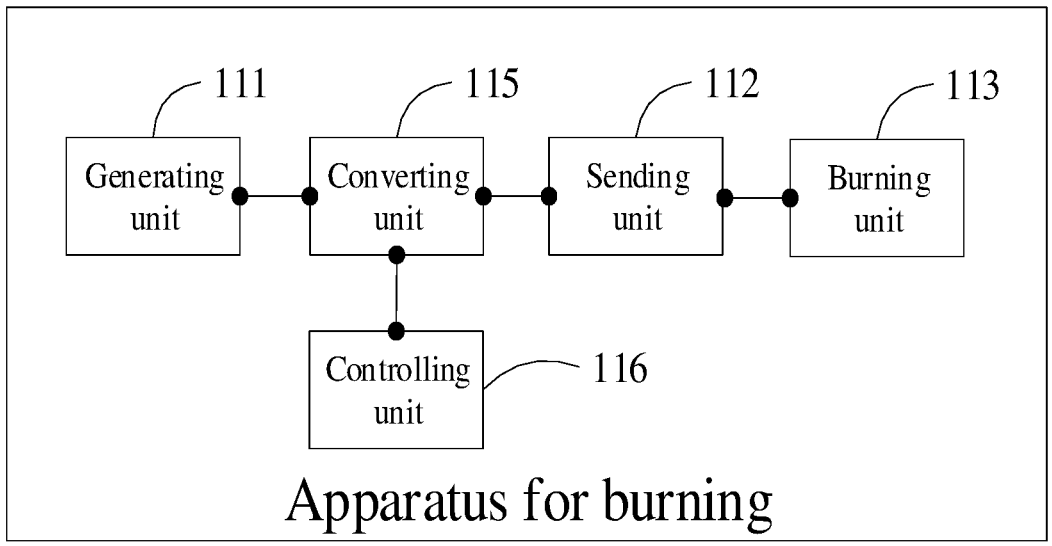

FIG. 22 is a schematic diagram of an apparatus for burning an address code of LED lamp beads in an embodiment of the present disclosure.

Figure 23:
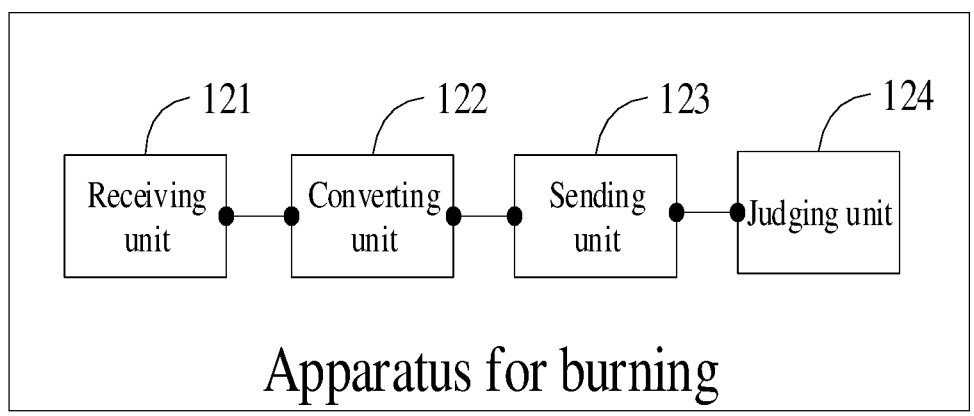

FIG. 23 is a schematic diagram of an apparatus for burning an address code of LED lamp beads in an embodiment of the present disclosure.

Figure 24:
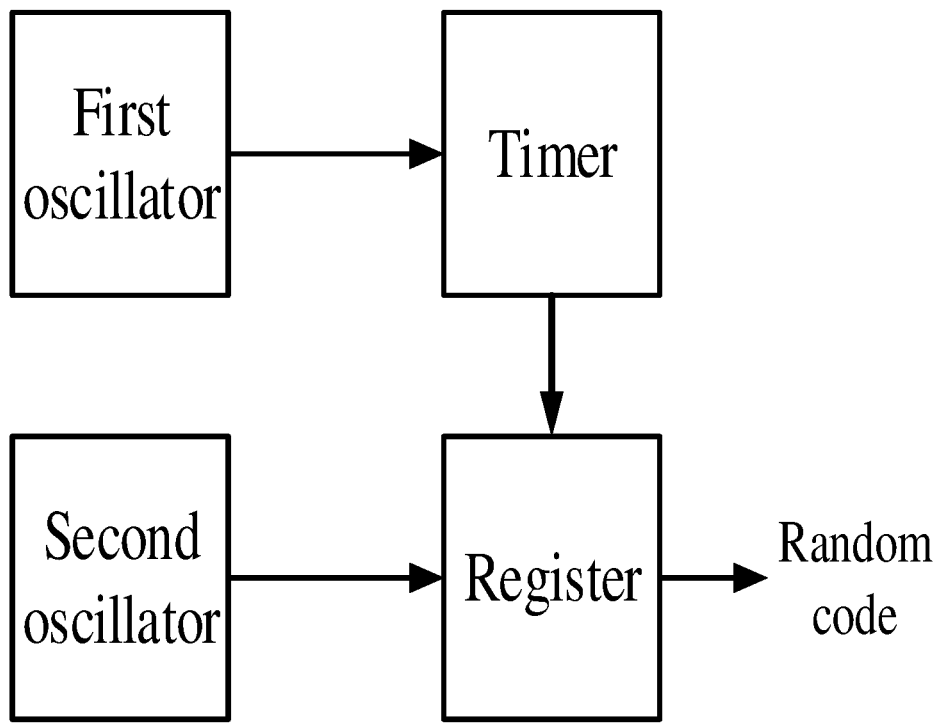

FIG. 24 is a schematic circuit diagram of a random code generation circuit in an embodiment of the present disclosure.

Figure 25:
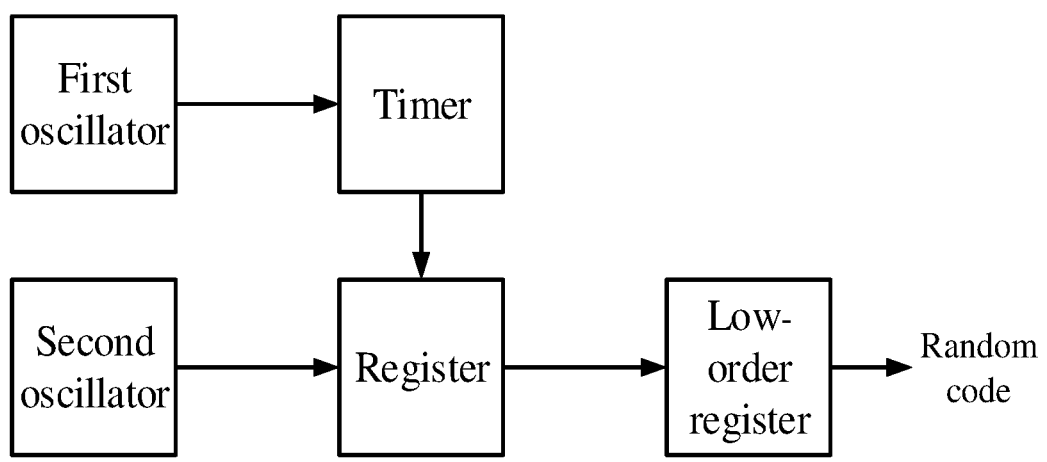

FIG. 25 is a schematic circuit diagram of a random code generation circuit in an embodiment of the present disclosure.

Figure 26:
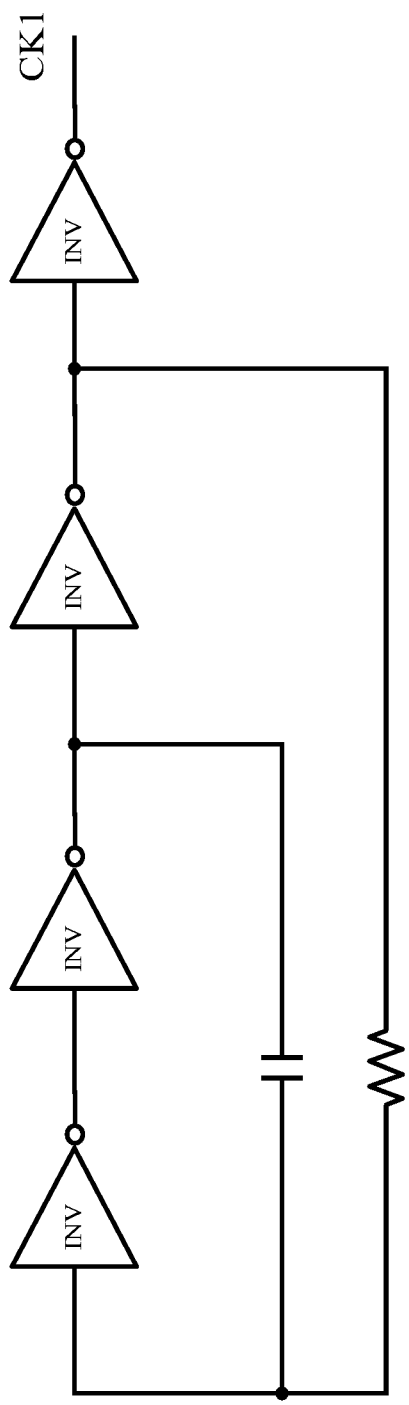

FIG. 26 is a schematic circuit diagram of an RC oscillator in an embodiment of the present disclosure.

Figure 27:
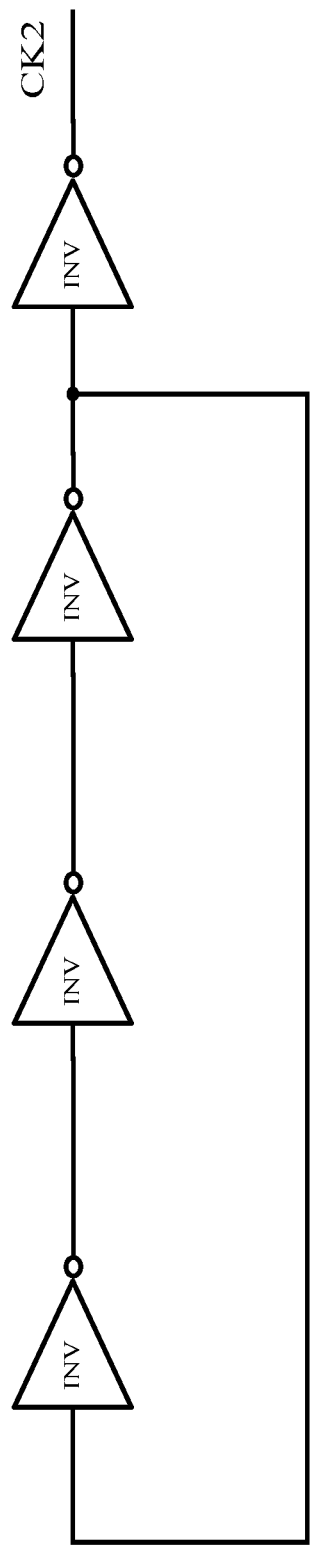

FIG. 27 is a schematic circuit diagram of an inverting oscillator in an embodiment of the present disclosure.

Figure 28:
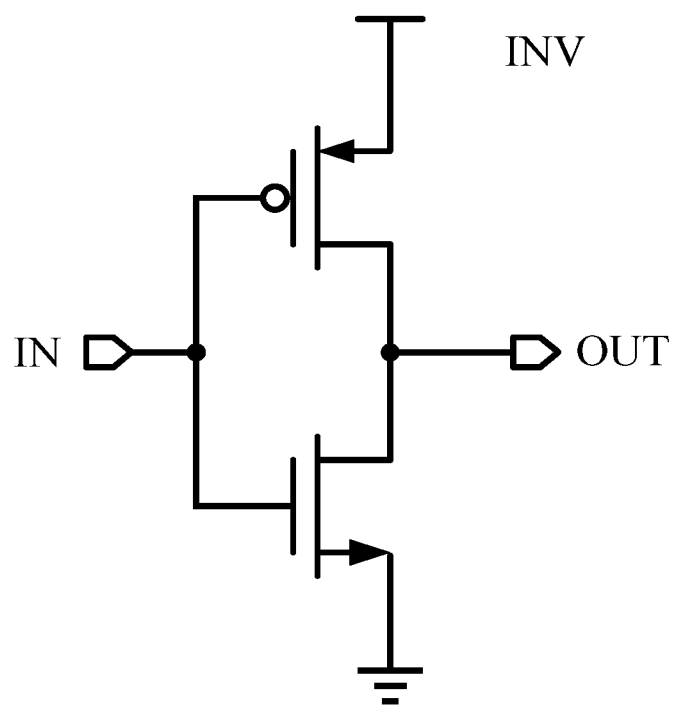

FIG. 28 is a schematic circuit diagram of an inverter in an embodiment of the present disclosure.

Figure 29:
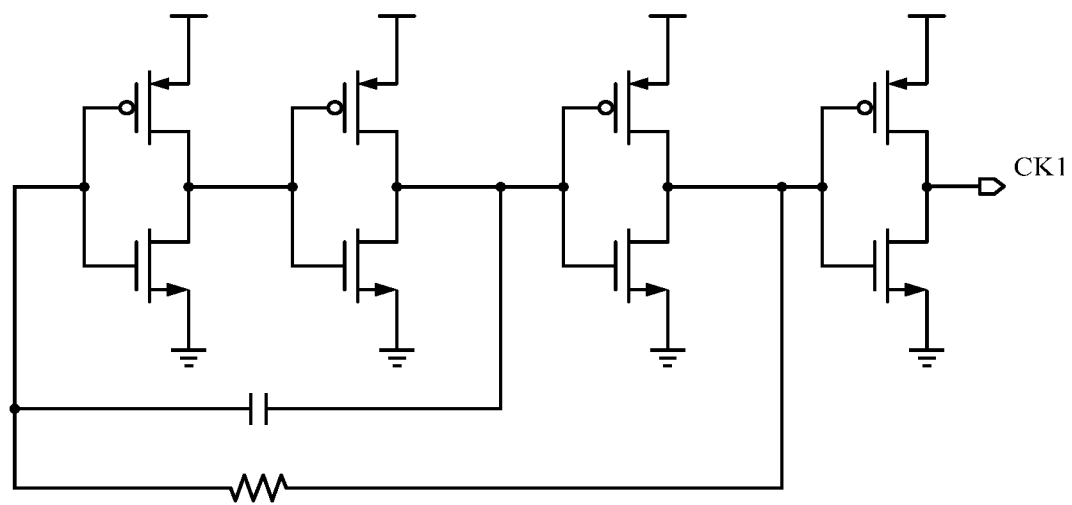

FIG. 29 is a schematic circuit diagram of an RC oscillator in an embodiment of the present disclosure.

Figure 30:
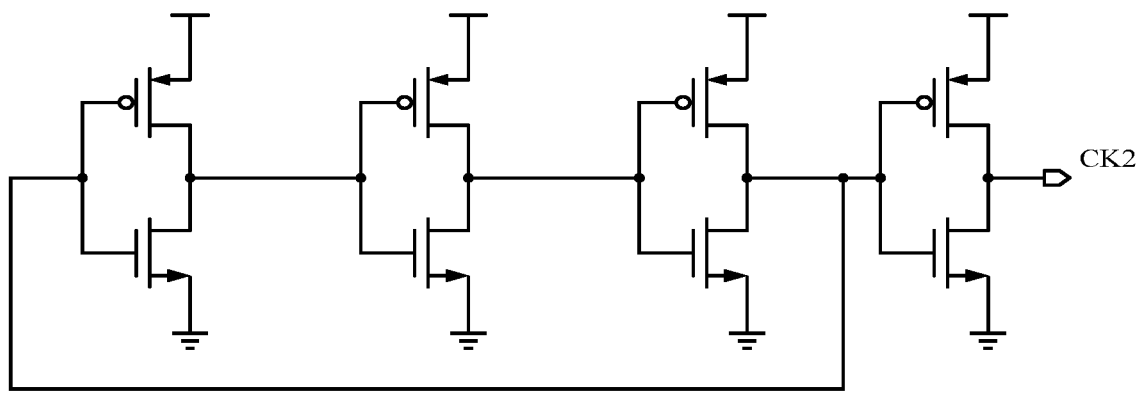

FIG. 30 is a schematic circuit diagram of an inverting oscillator in an embodiment of the present disclosure.

Figure 31:
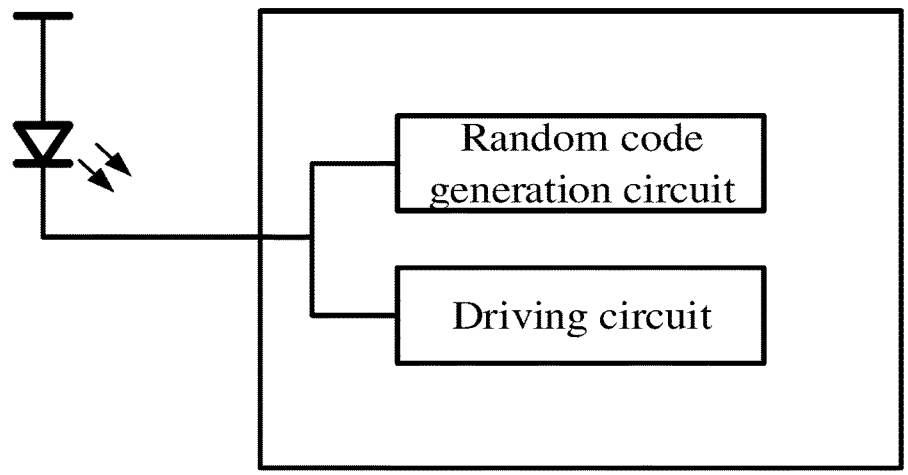

FIG. 31 is a schematic circuit diagram of an LED control apparatus in an embodiment of the present disclosure.

Figure 32:
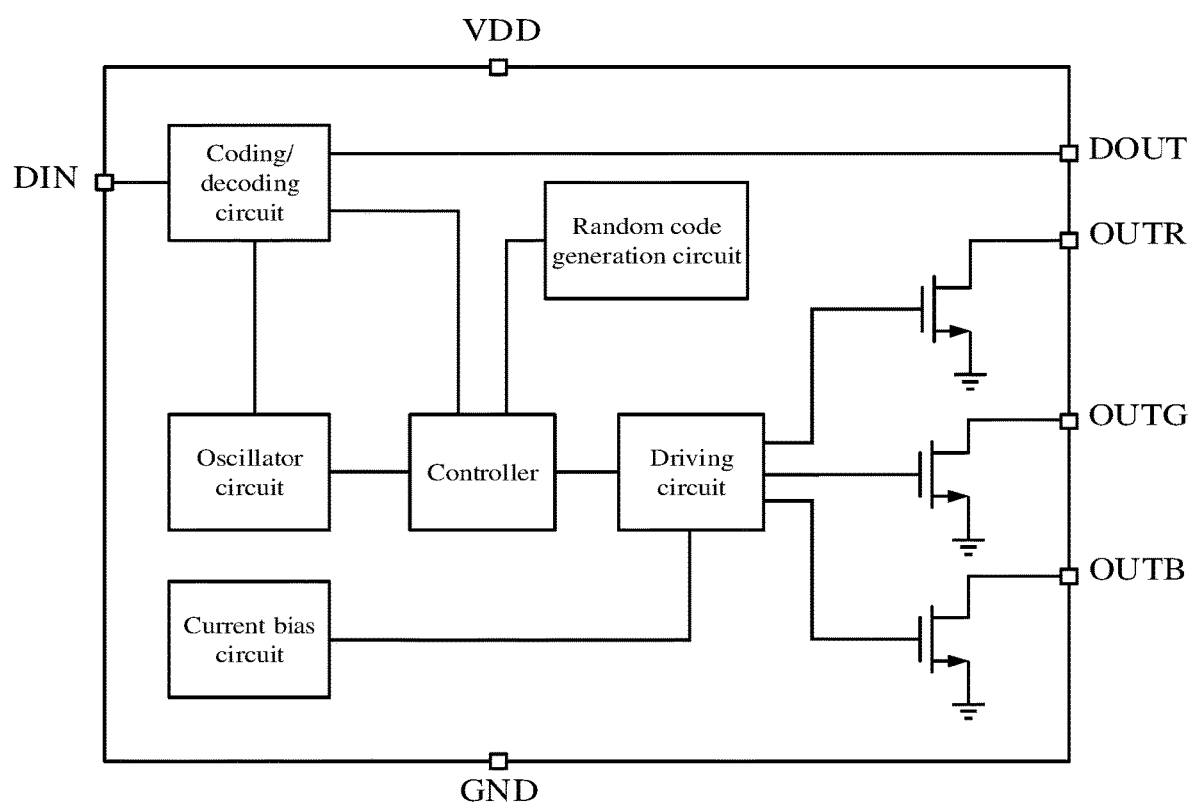

FIG. 32 is a schematic circuit diagram of an LED control apparatus in an embodiment of the present disclosure.

Description of Reference Numerals in FIG. 16 to FIG. 32

111—generating unit, 112—sending unit, 113—burning unit, 114—receiving unit, 115—converting unit, 116—judging unit, 121—receiving unit, 122—converting unit, 123—sending unit, and 124—judging unit.

DETAILED DESCRIPTION OF THE EMBODIMENTS

Implementations of the present disclosure are described below through specific detailed examples, and those skilled in the art can easily understand other advantages and effects of the present disclosure from the content disclosed in this specification. The present disclosure can also be implemented or applied through other different specific implementations, and various details in this specification can also be variously modified or changed based on different viewpoints and applications without departing from the spirit of the present disclosure. It should be noted that the following embodiments and features in the embodiments may be combined with each other under the condition of no conflict.

In order to better understand the technical solutions provided by the embodiments of the present disclosure, the technical background of the embodiments of the present disclosure is first introduced below. In the traditional sense, LED lamp beads are used as light-emitting devices, but a light-emitting diode (LED) is also essentially a PN junction. When receiving an optical signal, the LED lamp beads can generate a photovoltaic effect and become a photosensitive element, thereby converting the optical signal into an electrical signal.

Figure 4:
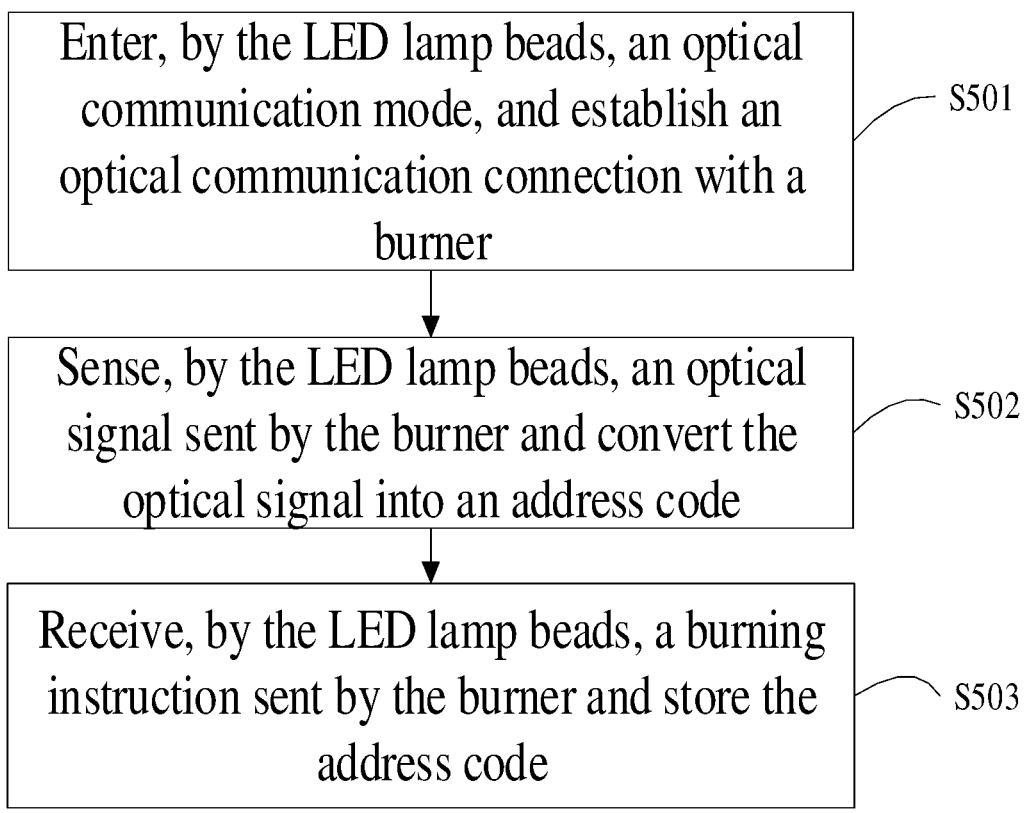
FIG. 4 is a flow chart of a method for burning an address code of LED lamp beads in an embodiment of the present disclosure.

In one embodiment, the present disclosure provides a method for burning an address code of LED lamp beads, applied to the LED lamp beads, and as shown in FIG. 4, including the following steps:

S501: the LED lamp beads enter an optical communication mode, and establish an optical communication connection with a burner;

S502: the LED lamp beads sense an optical signal sent by the burner and convert the optical signal into an address code; and S503: the LED lamp beads store the address code.

A control chip is usually arranged in each LED lamp bead, and an on/off condition of the LED lamp bead is controlled by the control chip. The address code of the LED lamp beads usually needs to be burnt by the burner or other burning systems. A lamp bead array usually includes the plurality of LED lamp beads, and the plurality of LED lamp beads may be connected in series, parallel, series-parallel combination and parallel-series combination. The burner itself does not know physical addresses of the LED lamp beads, that is, a location of each LED lamp bead. Therefore, it is impossible to directly burn the address code of the LED lamp beads. A specific combination manner in the lamp bead array is not limited here. The method disclosed in the above embodiment of the present disclosure is suitable for lamp bead arrays in all possible combination manners of the above series, parallel, series-parallel combination, and parallel-series combination.

For the above step S501, the LED lamp beads may enter the optical communication mode in various forms. Because the LED lamp beads may emit light and may receive light, the optical communication mode refers to that the LED lamp beads enter a light receiving mode. A photoelectric conversion module is arranged in the LED lamp beads. When the photoelectric conversion module is in an activated state, a received optical signal may be converted into an electrical signal.

In one embodiment, the burner may be connected to the lamp bead array through a controller. When the lamp bead array and the burner are powered on, the controller sends an electrical signal, such that the photoelectric conversion module of the LED lamp beads is in the activated state. The controller here may be a controller of the LED lamp beads, or may be a controller of the burner. The burner refers to a device or system that is capable of writing the address code into the control chips of the LED lamp beads. The burner may be an encoder, a burner device, or other control apparatus with a burning function.

In one embodiment, when the LED lamp beads detect connection to the burner, the LED lamp beads may automatically enter the optical communication mode. The establishment of the optical communication mode here refers to that on the basis of the optical communication connection, the burner may generate the optical signal and the LED lamp beads may sense the optical signal generated by the burner.

For the above step S502, one or more light sources may be arranged in the burner, and the burner generates the optical signal in a manner of light emission, and sends different optical signals to each LED lamp bead; and after sensing the optical signal, the LED lamp beads convert the optical signals into the address code. The burner may communicate with the plurality of LED lamp beads simultaneously.

In one embodiment, the optical signal is a pulse optical signal. At the moment, a pulse optical signal generating apparatus is arranged on the burner. An identification code may represent pulse optical signals of different waveforms, amplitudes, widths or repetition frequencies, the photoelectric conversion module is arranged in the LED lamp beads, and the photoelectric conversion module may receive the pulse optical signal.

In one embodiment, the optical signal is an optical signal of an on/off change. At the moment, the light source is arranged on the burner, a location of the light source corresponds to that of the LED lamp beads, and the identification code may represent different on/off conditions. For example, the identification code is 10101010, and an on/off condition of the corresponding light source is on/off/on/off/on/off/on/off.

In one embodiment, the optical signal is an optical signal representing a color. A color light source is arranged on the burner, a location of the color light source corresponds to that of the LED lamp beads, and the identification code may represent pigments of different colors.

In one embodiment, the optical signal may also be an optical signal with constantly changing light intensities. The identification code may represent the different light intensities, but it needs to be ensured that each LED lamp beads receive the different optical signals. For example, the optical signals received by the different LED lamp beads may be the different pulse optical signals, or may be the optical signals with the different light intensity changes, or may be the optical signals of different on/off changes, or may be the optical signals of the different colors.

For the above step S503, in one embodiment, after the LED lamp beads convert the optical signal into the address code, the address code may be automatically burnt and stored. In one embodiment, after the LED lamp beads convert the optical signal into the address code, the burner or other controllers may send a burning instruction to the LED lamp beads, and the LED lamp beads store the address code after receiving the burning instruction, thus realizing writing of the address code in the lamp beads. A manner that the LED lamp beads store the address code will not be described in detail here. At the moment, an advantage lies in that: by establishing the optical communication between the LED lamp beads and the burner, and by making use of an effect that the LED lamp beads sense light and produce electricity, the optical signal sent by the burner is converted into the address code, and the address code is burnt into the LED lamp beads. Thus, the present disclosure realizes the technical effect that, the address code is burnt after the LED lamp beads are assembled into a lamp bead array, and burning may still be performed in this way after maintenance and replacement. In the prior art, the situation is that: LED lamp beads are burnt before being combined into an array, consequently, a permanent address code is determined, and when replacing a fault LED lamp bead, even though the address code of the LED lamp beads is burnt, an original address code of the LED lamp beads still needs to be known, so maintenance is inconvenient.

In the present embodiment, the LED lamp beads receive the optical signal, convert the optical signal into an electrical signal, and generate the corresponding address code according to the electrical signal. The electrical signal here is a current, a magnitude of the current is amplified several times to obtain an amplified current, the amplified current is sampled and digitalized, and last N bits of the amplified current are used as a random code of the LED lamp beads. For example, after the LED lamp beads sense the optical signal, a 0.0031 A current is generated, a numerical value of the current after being amplified 100000 times is 310, a binary number corresponding thereto is 100110110, and the last 8 bits may be taken as the random code, that is, the corresponding random code is 00110110.

Figure 5:
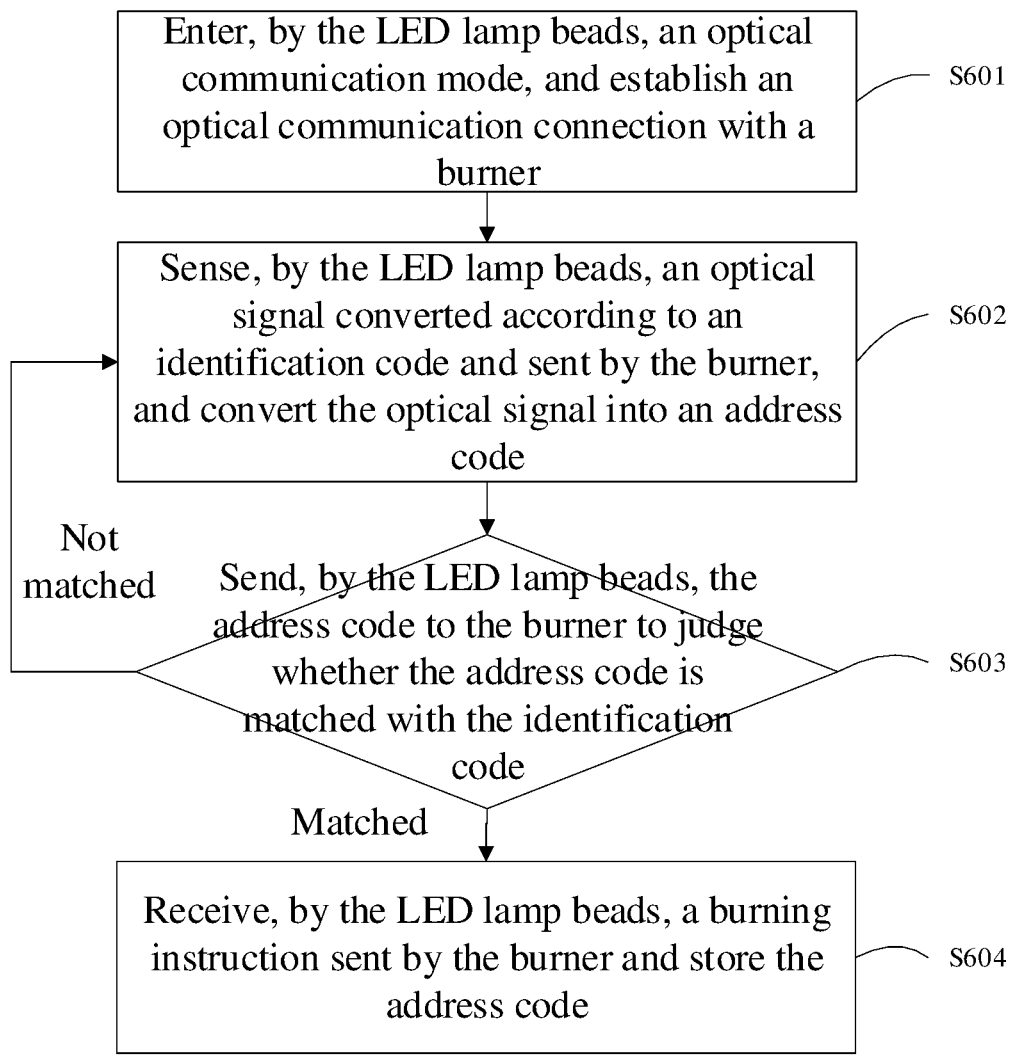
FIG. 5 is a flow chart of a method for burning an address code of LED lamp beads in an embodiment of the present disclosure.

Here, because of force majeure factors, an error may be produced inevitably when the LED lamp beads identify the optical signal, so identification of the optical signal is incorrect. Normally, after the LED lamp beads identify the optical signal, the address code converted from the optical signal by the LED lamp beads will be detected to judge whether it is correctly identified. In one embodiment, as shown in FIG. 5, the method for burning the address code of the LED lamp beads includes the following steps:

S601: the LED lamp beads enter the optical communication mode, and establish the optical communication connection with the burner;

S602: the LED lamp beads sense the optical signal converted according to the identification code and sent by the burner, and convert the optical signal into the address code;

S603: the LED lamp beads send the address code to the burner so as to judge whether the address code is matched with the identification code; and return to step S602 if the address code is not matched with the identification code; and S604: if the address code is matched with the identification code, the LED lamp beads receive the burning instruction sent by the burner, and store the address code.

In one embodiment, after identifying the optical signal, the LED lamp beads convert the optical signal into the address code. At the moment, burning of the address code of the LED lamp beads is not performed. Because the LED lamp beads itself cannot judge whether the received signal is correct, the LED lamp beads send the address code to the burner, so that the address code and the identification code are matched in the burner. Here, the controller of the burner may also be considered as a part of the burner. Matching here may be understood as that a correct address code may be the same as the identification code, so when the address code is the same as the identification code, the address code is matched with the identification code, and the optical signal identified by the LED lamp beads is correct; and the address code may also be different from the identification code, however, the correct address code may also be different from the identification code, but may correspond to the identification code, so when the address code corresponds to the identification code, it may also be understood as the address code being matched with the identification code. For example, when the address code corresponds to the identification code, the identification code is 10101010, and the address code may be 01010101. At the moment, the address code is matched with the identification code. For step S603, when the address code is not matched with the identification code, the LED lamp beads receive the optical signal sent by the burner again, convert the optical signal into the address code again, and cover the previous address code with the address code converted again. That is, when the address code is not matched with the identification code, address code burning is not performed. Instead, the LED lamp beads receive the optical signal again and convert the optical signal into the address code, and the address code will not be burnt until the address code is matched with the identification code. An advantage lies in that, when the optical signal identified by the LED lamp beads is incorrect, an address code burning error is avoided through repeated optical signal identification. An advantage lies in that, when the address code is not matched with the identification code, the LED lamp beads sense the optical signal generated by the burner again, convert the optical signal into the address code and cover the previous address code.

In one embodiment, after the LED lamp beads sense the optical signal converted according to the identification code and sent by the burner, and convert the optical signal into the address code, the LED lamp beads receive a check code sent by the burner, and the LED lamp beads judge whether the address code is matched with the identification code according to the check code; and when the address code is not matched with the identification code, the LED lamp beads sense the optical signal sent by the burner again, convert the optical signal into the address code, and cover the previous address code with the converted address code.

That is, check of the address code is performed in the lamp beads. After the burner generates the optical signal and causes the LED lamp beads to identify the optical signal, the burner sends the check code matched with the optical signal to the LED lamp beads, and when the LED lamp beads identify that the check code is the same as the address code converted thereby, the address code is burnt into the LED lamp beads. The check code here may be the same as the identification code, or may be different from the identification code. For example, when the identification code is 1010, the check code may be 1010, or may be 0101, or may be other numerical values. It should be noted that, the check code may be sent through the controller of the burner, or the check code may be sent through the controller of the lamp beads, or may be sent through other controllers. By sending the check code to the lamp beads, matching of the identification code in the LED lamp beads is realized, so accuracy of optical signal identification is increased.

Figure 7:
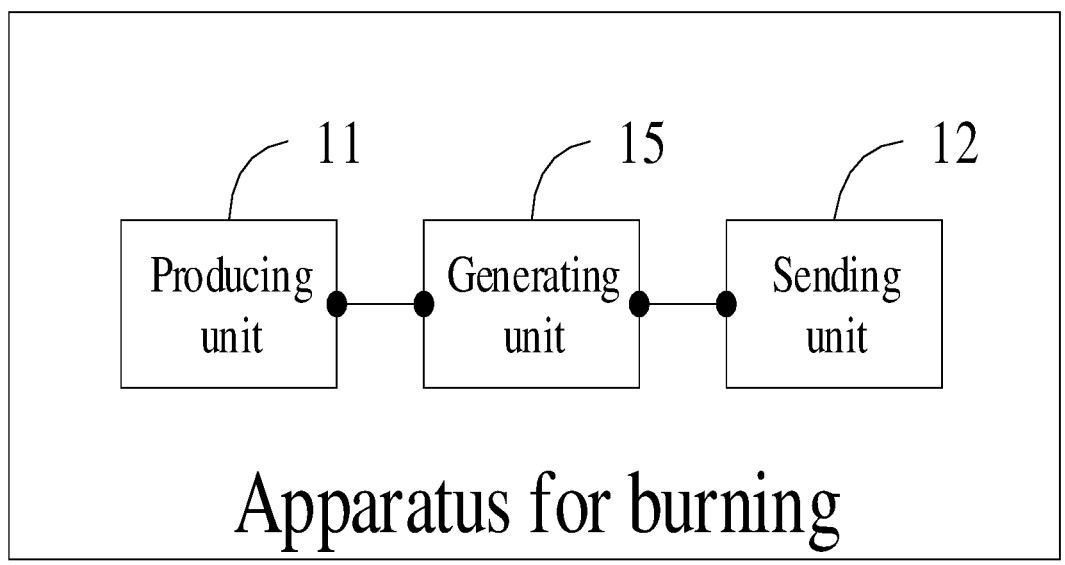
FIG. 7 is a schematic diagram of an apparatus for burning an address code of LED lamp beads in an embodiment of the present disclosure.

In one embodiment, the present disclosure provides a method for burning an address code of LED lamp beads, applied to the LED lamp beads, and as shown in FIG. 7, including:

S701: the LED lamp beads enter an optical communication mode, and establish an optical communication connection with a burner;

S702: the LED lamp beads receive an optical signal sent by the burner, and the LED lamp beads convert the optical signal into a temporary address code; and S703: the LED lamp beads receive a burning instruction sent by the burner and including the temporary address code and a permanent address code corresponding to the temporary address code, perform addressing according to the temporary address code, and store the permanent address code.

For step S702, an effect of the temporary address code is to make the burner be aware of a location of each LED lamp bead in a lamp bead array so as to distinguish each LED lamp bead. The permanent address codes may be generated in sequence according to the locations of the LED lamp beads in the lamp bead array. For example, a series circuit includes 100 LED lamp beads, and 100 permanent address codes may be respectively 0000001 to 1100100. Of course, the permanent address code may also be the same as a random code. That is, the burner may directly burn the temporary address code as the permanent address code into the LED lamp beads. In one embodiment, after the LED lamp beads receive the burning instruction, the burning instruction may be sent to the LED lamp beads through the burner or other controllers, such that the LED lamp beads store the permanent address code, thus realizing writing of the address code into the LED lamp beads.

In the present embodiment, after converting the optical signal by the burner through an identification code and converting, by the LED lamp beads, the optical signal into the temporary address code, the method further includes: the LED lamp beads send the temporary address code to the burner so as to judge whether the temporary address code is matched with the identification code; and when the temporary address code is not matched with the identification code, the LED lamp beads sense the optical signal sent by the burner again, convert the optical signal into the temporary address code, and cover the previous temporary address code with the converted temporary address code.

The method has an advantage that, through the steps that the LED lamp beads establish the optical communication connection with the burner, receive the optical signal sent by the burner and convert the same into the temporary address code, marking of the locations of the LED lamp beads in the lamp bead array is realized, and the permanent address code is burnt into the lamp beads according to the sell-defined permanent address code further through identifying the burning instruction sent by the burner and carrying the temporary address code and the permanent address code. In the meantime, burning of the address codes after the LED lamp beads are assembled into the lamp bead array is realized, so the situation that because the LED lamp beads are burnt before being combined into a strip, the permanent address code is determined and consequently maintenance and replacement are inconvenient is avoided.

In one embodiment, the present disclosure provides a module for burning an address code of LED lamp beads, applied to the LED lamp beads, and including: a sensing unit, configured to sense an optical signal sent by a burner; a converting unit, configured to convert the optical signal into an address code; a receiving unit, configured to receive a burning instruction sent by the burner; and a storing unit, configured to store the address code in the LED lamp beads.

Figure 8:
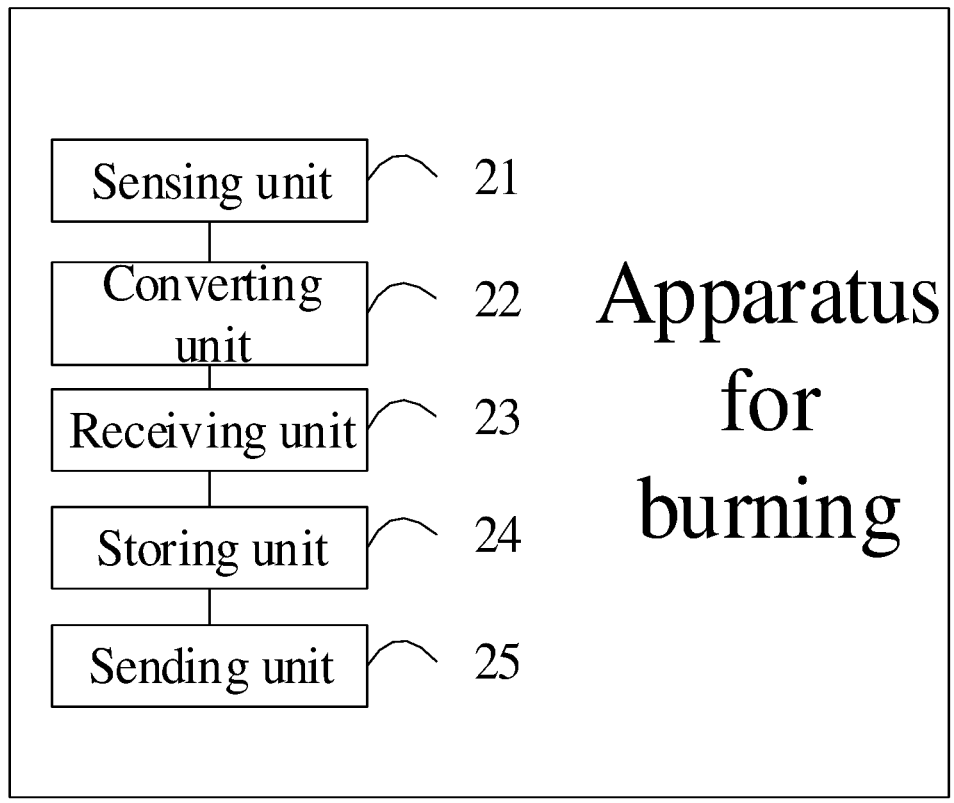
FIG. 8 is a schematic diagram of an apparatus for burning an address code of LED lamp beads in an embodiment of the present disclosure.

Optionally, as shown in FIG. 8, the module for burning the address code of the LED lamp beads further includes: the sending unit, configured to send the address code to the burner so as to judge whether the address code is matched with an identification code; the receiving unit is further configured to receive the optical signal sent by the burner again when the address code is not matched with the identification code; and the converting unit is further configured to convert the optical signal into the address code again and cover the previous address code with the address code converted again.

The module for burning the address code of the LED lamp beads according to the present disclosure has the same beneficial effects as the above method for burning the address code of the LED lamp beads, which will not be repeated here.

In one embodiment, the present disclosure provides a lamp bead, including a computer-readable storage medium storing a computer program, and a processor. When being read and run by the processor, the computer program implements any one of the above methods for burning the address code of the LED lamp beads. The lamp bead in the present disclosure has same beneficial effects as the above method for burning the address code of the LED lamp beads, which will not be repeated here.

Figure 1:
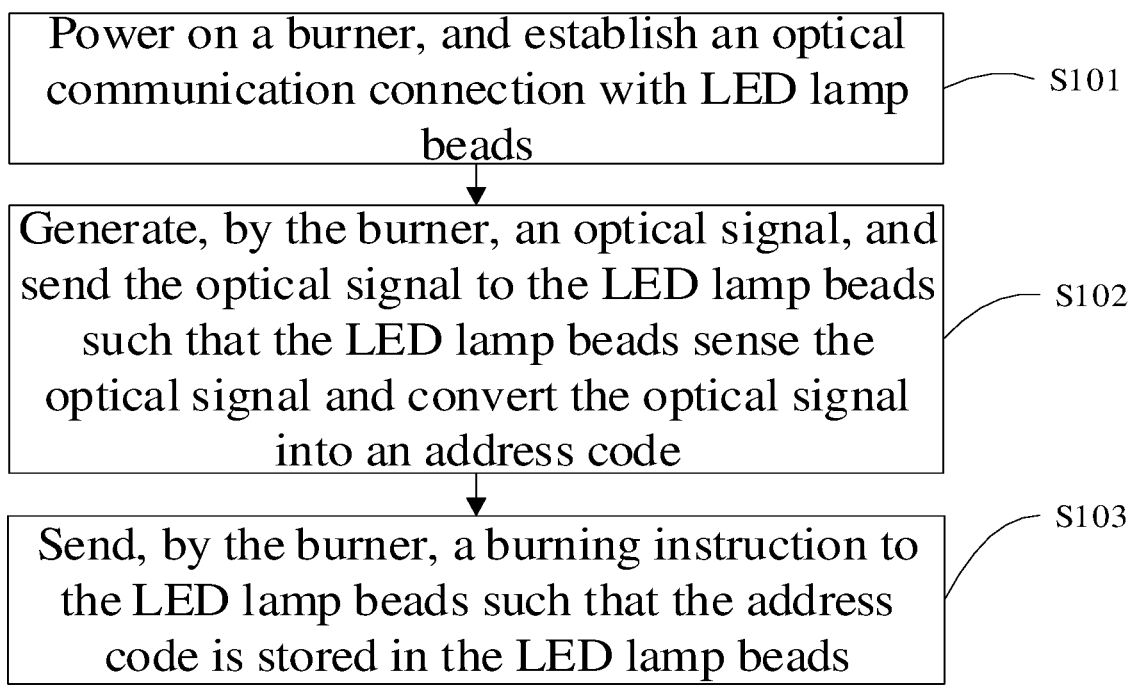
FIG. 1 is a flow chart of a method for burning an address code of LED lamp beads in an embodiment of the present disclosure.

In one embodiment, the present disclosure further provides a method for burning an address code of LED lamp beads, applied to a burner, and as shown in FIG. 1, including: S101: the burner is powered on, and establishes an optical communication connection with the LED lamp beads; S102: the burner generates an optical signal and sends the optical signal to the LED lamp beads, such that the LED lamp beads sense the optical signal and convert the optical signal into an address code; and S103: the burner sends a burning instruction to the LED lamp beads, such that the LED lamp beads store the address code.

For step S101, the burner may be connected to a lamp bead array through a controller. After the lamp bead array and the burner are powered on, the controller sends an electrical signal, such that the LED lamp beads enter an optical communication mode; and under the optical communication mode, a photoelectric conversion module of the LED lamp beads is in an activated state, so that the LED lamp beads may receive an optical signal from an external light source. In one embodiment, the burner may be connected to the lamp bead array through the controller. After the lamp bead array and the burner are powered on, the LED lamp beads may automatically enter the optical communication mode. The controller here may be a controller of the LED lamp beads, or may be a controller of the burner. The burner refers to a device or system that is capable of writing the address code into control chips of the LED lamp beads. The burner may be an encoder, a burner device, or other control apparatus with a burning function.

For step S102, the lamp bead array usually includes the plurality of LED lamp beads, and the plurality of LED lamp beads may be connected in series, parallel, series-parallel combination and parallel-series combination. Here, one or more light sources are arranged in the burner, and the burner needs to generate the optical signal in a manner of light emission, and sends the different optical signals to each LED lamp bead; and the burner may communicate with the plurality of LED lamp beads simultaneously. The optical signal may be a pulse optical signal. The optical signal may be an optical signal of an on/off change. The optical signal may be an optical signal representing a color. The optical signal may also be an optical signal with constantly changing light intensities. It should be ensured that each LED lamp beads receive the different optical signals. For example, the optical signals received by the different LED lamp beads may be the different pulse optical signals, or may be the optical signals with different light intensity changes, or may be the optical signals of different on/off changes, or may be the optical signals of different colors. After receiving the optical signal, the LED lamp beads convert the optical signal into a digital signal, and thus generate the corresponding address code according to the digital signal. Sending the optical signal to the LED lamp beads by the burner refers to that, the light source of the burner emits light, the light may be transmitted to the LED lamp beads, and therefore the LED lamp beads sense the light emitted by the light source.

For step S103, after generating the optical signal, the burner sends the burning instruction to the LED lamp beads. After the LED lamp beads convert the optical signal into the address code, the address code is directly stored in the LED lamp beads. Through the step that the burner sends the burning instruction to the LED lamp beads again, instruction-based address code burning is realized, so burning disorder due to the fact that the LED lamp beads perform storage of the address code while receiving the optical signal is avoided. Of course, after the LED lamp beads convert the optical signal into the address code, the address code may directly be burnt without the burner sending the burning instruction again.

The present disclosure makes use of a light sensing effect of the LED lamp beads, and the burner sends the optical signal to the LED lamp beads, such that the LED lamp beads generate the address code according to the optical signal and burn the address code into the LED lamp beads. The present disclosure may perform the burning after the LED lamp beads are combined into the lamp bead array, so the situation that because the LED lamp beads are burnt one by one before the LED lamp beads are combined into a strip, maintenance of the LED lamp beads is inconvenient is avoided.

In order to ensure that the burner emits the different optical signals, a method for burning an address code of LED lamp beads, applied to a burner, and including the following steps:

S201: the burner is powered on, and establishes an optical communication connection with the LED lamp beads;

S202: the burner obtains an identification code and converts the identification code into an optical signal;

S203: the burner sends the optical signal to the LED lamp beads, such that the LED lamp beads sense the optical signal and convert the optical signal into the address code; and S204: the burner sends a burning instruction to the LED lamp beads, such that the LED lamp beads store the address code.

In S202, before the burner generates the optical signal, the identification code is obtained first through the burner, and then the identification code is converted into the optical signal. The identification codes may be randomly generated through the burner, or may be generated in sequence through the burner, or may be called through a storage of the burner. Here, for the plurality of lamp beads, the plurality of identification codes need to be obtained, and the quantity of the identification codes is greater than or equal to the quantity of the lamp beads. The identification code here may be a series of numbers. In one embodiment, the identification code is a series of binary digits. For example, a four-digit identification code may be any number between 0000 and 1111, but the number of digit of the identification code is not uniquely determined in the present disclosure. It should be noted that there are the plurality of identification codes, and the burner converts the different identification codes into the different optical signals, and sends the different optical signals to the different LED lamp beads, thus realizing burning of the plurality of lamp beads in the lamp bead array. In order for each LED lamp bead to receive the different light signals, the quantity of the identification codes needs to be greater than or equal to the actual quantity of the LED lamp beads. In one embodiment, the identification code may be preset in the burner. For example, the identification codes of 00000001-11111111 are preset in the storage of the burner, and the burner converts the identification codes of 00000001-11111111 into the optical signals respectively to be sent to the LED lamp beads.

In one embodiment, the optical signal is a pulse optical signal. At the moment, a pulse optical signal generating apparatus is arranged on the burner. The identification code may represent pulse optical signals of different waveforms, amplitudes, widths or repetition frequencies, a photoelectric conversion module is arranged in the LED lamp beads, and the photoelectric conversion module may receive the pulse optical signal. After receiving the pulse optical signal, the LED lamp beads convert the pulse optical signal into the address code.

In one embodiment, the optical signal is an optical signal of an on/off change. At the moment, a light source is arranged on the burner, a location of the light source corresponds to that of the LED lamp beads, and the identification code may represent different on/off conditions. For example, the identification code is 10101010, and an on/off condition of the corresponding light source is on/off/on/off/on/off/on/off. In one embodiment, on/off duration of the light source may be set in the burner. For example, when the identification code is 0101, the light source may be set to be off for 1 second, on for 1 second, off for 1 second, and on for 1 second. For another example, when the identification code is 1010, the light source may be set to be on for 1 second, off for 1 second, on for 1 second, and off for 1 second.

In one embodiment, the optical signal is an optical signal representing a color. A color light source is arranged on the burner, a location of the color light source corresponds to that of the LED lamp beads, and the identification code may represent pigments of different colors. In one embodiment, the optical signal may also be an optical signal with constantly changing light intensities, and the identification code may represent different light intensities.

In one embodiment, after the burner converts all the identification codes into the optical signals and sends the optical signals to the LED lamp beads, LED lamp beads not receiving the optical signals are detected; and after all the lamp beads have received the optical signals and converted the same into the address codes, the burner sends the burning instruction and burns the address codes into the LED lamp beads. When it is detected that there are still lamp beads that have not received the optical signals, the burner continues to obtain the identification codes, converts the identification codes into the optical signals and sends the same to the LED lamp beads. An advantage of the arrangement is that, the burner generates the identification codes first, and converts the identification codes into the optical signals, so as to distinguish the different optical signals effectively by representing the optical signals through the identification codes.

In one embodiment, the identification codes may be randomly generated by the burner, but repeated codes may exist in the identification codes generated by the burner. For example, when there are 10 identification codes and the identification codes are four-digit binary digits, a probability that repeated codes exist in the identification codes randomly generated by the burner is 97.4%. For another example, when there are 10 identification codes and the identification codes are five-digit binary digits, the probability that the repeated codes exist in the identification codes randomly generated by the burner is 80%. For another example, when there are 10 identification codes and the identification codes are six-digit binary digits, the probability that the repeated codes exist in the identification codes randomly generated by the burner is 53%. For another example, when there are 10 identification codes and the identification codes are seven-digit binary digits, the probability that the repeated codes exist in the identification codes randomly generated by the burner is 17%. For another example, when there are 10 identification codes and the identification codes are eight-digit binary digits, the probability that the repeated codes exist in the identification codes randomly generated by the burner is 9%. For another example, when there are 10 identification codes and the identification codes are nine-digit binary digits, the probability that the repeated codes exist in the identification codes randomly generated by the burner is 4.4%. Therefore, the probability that the repeated codes exist in the identification codes randomly generated by the burner is in inverse ratio to the number of digits of the identification codes. That is, the higher the number of digits of the identification codes, the lower the probability that the repeated codes exist in the identification codes randomly generated by the burner. When the number of digits of the identification codes is large enough, the probability that the repeated codes exist in the identification codes approaches 0. The repeated codes refer to that at least two identification codes are the same in the identification codes randomly generated by the burner.

Figure 2:
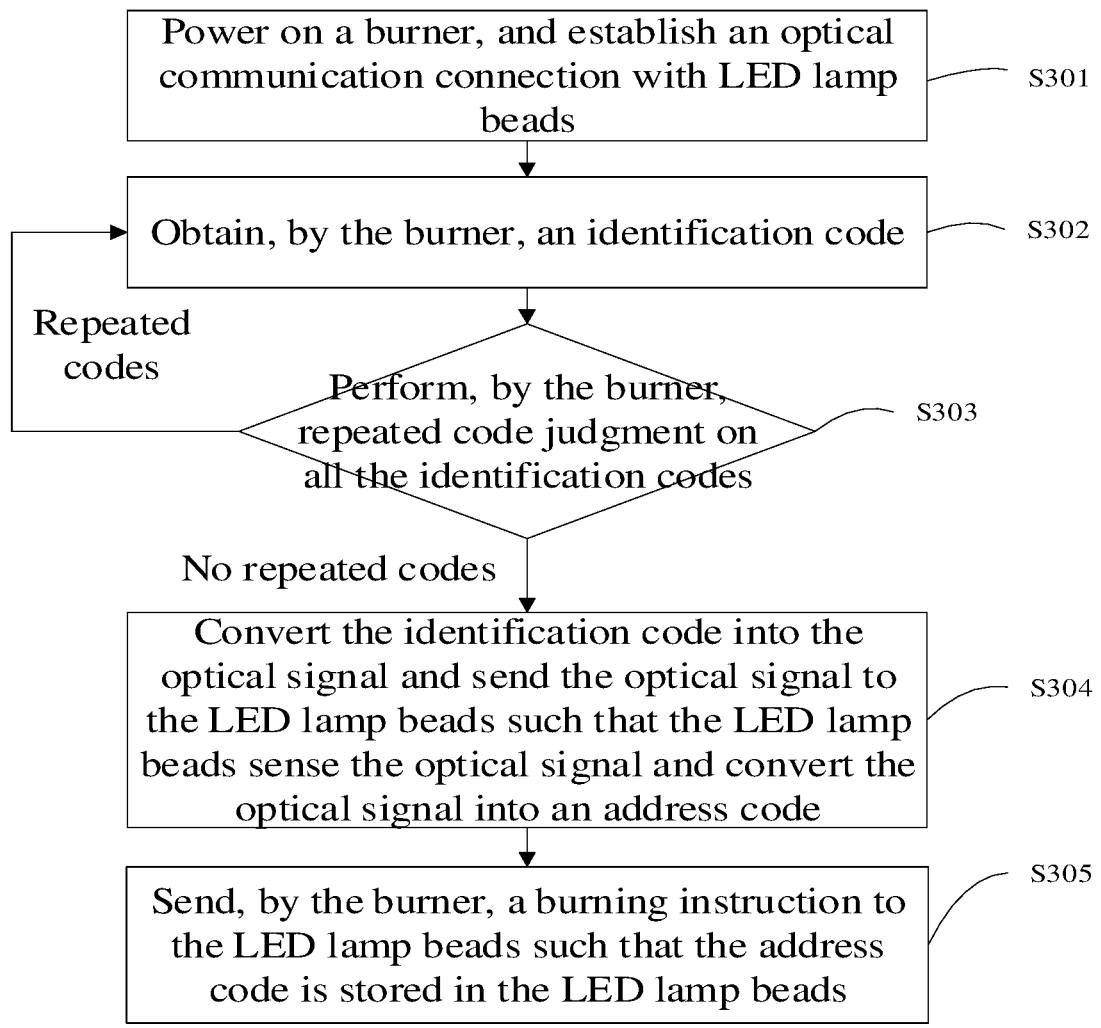
FIG. 2 is a flow chart of a method for burning an address code of LED lamp beads in an embodiment of the present disclosure.

In order to ensure that no repeated code exists in the identification codes generated by the burner, as shown in FIG. 2, in one embodiment, the present disclosure provides a method for burning an address code of LED lamp beads, applied to a burner, and including the following steps:

S301: the burner is powered on, and establishes an optical communication connection with the LED lamp beads;

S302: the burner obtains an identification code;

S303: the burner performs repeated code judgment on all the identification codes; and return to step S302 when repeated codes exist in all the identification codes;

S304: when no repeated code exists in all the identification codes, the burner converts the identification code into an optical signal and sends the same to the LED lamp beads, such that the LED lamp beads sense the optical signal and convert the optical signal into the address code; and S305: the burner sends a burning instruction to the LED lamp beads, such that the LED lamp beads store the address code.

For step S303, before converting the identification code into the optical signal by the burner, the method for burning the address code of the LED lamp beads further includes the following steps:

the burner performs repeated code judgment on all the identification codes;

when no repeated code exists in all the identification codes, the burner converts the identification code into the optical signal and sends the same to the LED lamp beads; and when the repeated codes exist in all the identification codes, the burner obtains the identification code again and covers the previous identification code.

In one embodiment, after the burner randomly generates a set quantity of identification codes and performs repeated code judgment on the identification codes, when the repeated codes exist in all the identification codes, the burner re-generates the set quantity of identification codes, and the operation is repeated until no repeated code exists in the identification codes.

In one embodiment, when the repeated codes exist in all the identification codes, the identification codes having the repeated codes are obtained, and the identification codes having the repeated codes are blocked and are not converted into the optical signals.

In one embodiment, the plurality of identification codes having the repeated codes are only converted into the optical signal once. The set quantity here is set according to the estimated quantity of the LED lamp beads, and the preset quantity needs to be greater than or equal to the estimated quantity of the LED lamp beads.

An advantage lies in that, through repeated code judgment, when the repeated codes exist, the identification codes are re-obtained to cover the previous identification codes. Therefore, the situations that the identification codes generated for the LED lamp beads are repeated so the address code recorded in the LED lamp beads are also the same, that light emission conditions of the LED lamp beads having the repeated codes are always the same and consequently cause disorder of the light effect, and that a light control effect is lower than expectation are avoided.

In one embodiment, when the repeated codes exist in all the identification codes, the identification codes having the repeated codes are obtained, such that identification codes are randomly re-generated in the identification codes having the repeated codes and the identification codes not used.

In one embodiment, when the burner detects that the identification codes are relatively concentrated in a numerical region, a regional repeated code instruction is sent, such that all the identification codes in the numerical region are re-generated. For example, the identification codes include: 0001100100, 0001100101, 0001100110 and 0001100111, and then the burner may send a 0001100XXX+ identification code re-generating instruction. At the moment, identification codes with the first seven digits being 0001100 in all the identification codes are re-generated. An advantage lies in that, the identification codes in the numerical region where the identification codes are relatively concentrated are re-generated, an identification error of the identification codes caused by concentrated identification codes is avoided, and an accuracy of subsequent optical signal identification is improved.

Figure 3:
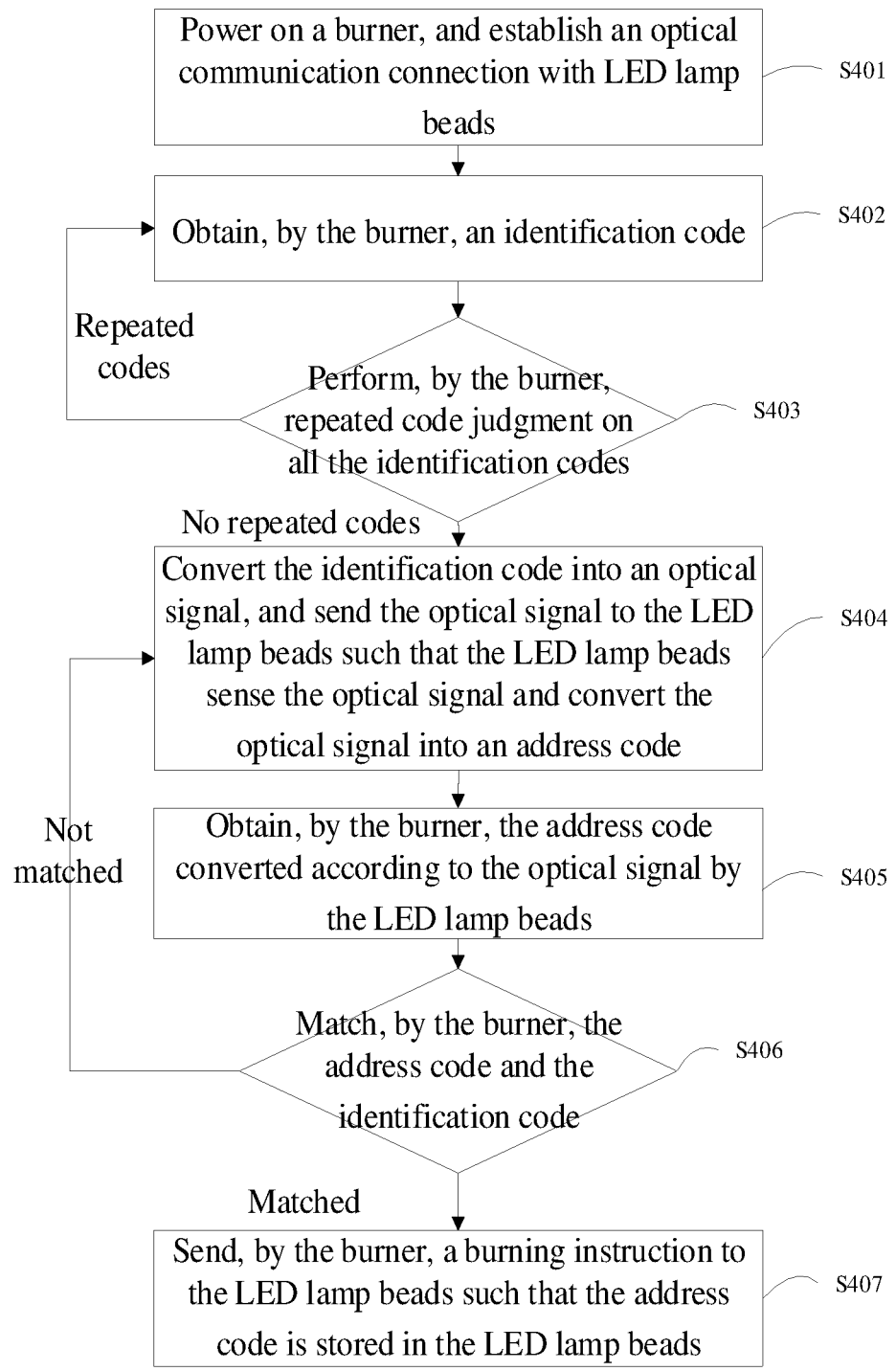
FIG. 3 is a flow chart of a method for burning an address code of LED lamp beads in an embodiment of the present disclosure.

In order to ensure that the optical signal identified by the LED lamp beads is correct, the address code needs to be verified here. As shown in FIG. 3, a method for burning an address code of LED lamp beads includes the following steps:

S401: a burner is powered on, and establishes an optical communication connection with the LED lamp beads;

S402: the burner obtains an identification code;

S403: the burner performs repeated code judgment on all the identification codes; and return to step S402 when repeated codes exist in all the identification codes;

S404: when no repeated code exists in all the identification codes, the burner converts the identification code into an optical signal and sends the optical signal to the LED lamp beads, such that the LED lamp beads sense the optical signal and convert the optical signal into the address code;

S405: the burner obtains the address code converted by the LED lamp beads according to the optical signal;

S406: the burner matches the address code with the identification code; and if the address code is not matched with the identification code, the optical signal identified by the LED lamp beads is incorrect, and return to step S404; and S407: if the address code is matched with the identification code, the burner sends a burning instruction to the LED lamp beads, such that the LED lamp beads store the address code.

Because of force majeure factors, an error may be produced inevitably when the LED lamp beads identify the optical signal, so identification of the optical signal is incorrect. Normally, after the LED lamp beads identify the optical signal, the address code converted from the optical signal by the LED lamp beads will be detected to judge whether it is correctly identified. In one embodiment, after identifying the optical signal, the LED lamp beads convert the optical signal into the address code. At the moment, burning of the address code of the LED lamp beads is not performed. Because the LED lamp beads itself cannot judge whether the received signal is correct, the LED lamp beads send the address code to the burner, so that the address code and the identification code are matched in the burner. Here, a controller of the burner may also be considered as a part of the burner. Matching here may be understood as that a correct address code may be the same as the identification code, so when the address code is the same as the identification code, the address code is matched with the identification code, and the optical signal identified by the LED lamp beads is correct; and the address code may also be different from the identification code, however, the correct address code may also be different from the identification code, but may correspond to the identification code, so when the address code corresponds to the identification code, it may also be understood as the address code being matched with the identification code. For example, when the address code corresponds to the identification code, the identification code is 10101010, and the address code may be 01010101. At the moment, the address code is matched with the identification code. An advantage lies in that, by sending the address code to the burner to be matched with the identification code, whether the optical signal identified by the LED lamp beads is correct is judged, so that an accuracy of LED lamp bead address code burning is improved.

In one embodiment, when the address code is not matched with the identification code, the burner generates the optical signal again, sends the optical signal to the LED lamp beads, such that the LED lamp beads convert the optical signal into the address code, and burn the address code into the LED lamp beads. That is, when the address code is not matched with the identification code, burning is not performed. Instead, the burner re-generates the optical signal, such that the LED lamp beads re-identify until the address code is matched with the identification code before the address code is burnt. An advantage lies in that, when the optical signal identified by the LED lamp beads is incorrect, the optical signal is repeatedly sent to the LED lamp beads for identification, and the previous identification codes are covered, so an address code burning error is avoided.

In an embodiment of the present disclosure, after generating, by the burner, the optical signal and sending the optical signal to the LED lamp beads, such that the LED lamp beads convert the optical signal into the address code, the method further includes the following steps: the burner sends a check code to the LED lamp beads, such that the LED lamp beads judge whether the address code is matched with the identification code according to the check code; and when the address code is not matched with the identification code, the optical signal identified by the LED lamp beads is incorrect.

That is, check of the address code is performed in the lamp beads. After the burner generates the optical signal and causes the LED lamp beads to identify the optical signal, the burner sends the check code matched with the optical signal to the LED lamp beads, and when the LED lamp beads identify that the check code is the same as the address code converted thereby, the address code is burnt into the LED lamp beads. The check code here may be the same as the identification code, or may be different from the identification code. For example, when the identification code is 1010, the check code may be 1010, or may be 0101, or may be other numerical values. It should be noted that the check code may be sent through the controller of the burner, or may be sent through the controller of the lamp beads, or may be sent through other controllers. By sending the check code to the lamp beads, matching of the identification code in the LED lamp beads is realized, so accuracy of optical signal identification is increased.

When the identification code is randomly generated by the burner, after the LED lamp beads convert the optical signal into the address code, the address code is randomly generated equivalently. Therefore, when burning needs to be performed according to a preset coding sequence, the address code of the LED lamp beads needs to be burnt according to a preset address code.

In one embodiment, a method for burning an address code of LED lamp beads, applied to a burner, and including the following steps:

S701: the burner is powered on, and establishes an optical communication connection with the LED lamp beads;

S702: the burner generates an optical signal and sends the optical signal to the LED lamp beads, such that the LED lamp beads convert the optical signal into a temporary address code; and S703: the burner generates a burning instruction including the temporary address code and the permanent address code, sends the same to the LED lamp beads, such that the LED lamp beads identify the temporary address code in the burning instruction, and store the permanent address code in the LED lamp beads.

For step S702, the LED lamp beads receive the optical signal and convert the optical signal into the address code, but the address code is the temporary address code only temporarily stored in the LED lamp beads. It should be noted that before the burner sends the identification code to the LED lamp beads through the optical signal, the burner is not aware of locations of the LED lamp beads in the lamp bead array. After the burner sends the identification code to the LED lamp beads through the optical signal, the LED lamp beads convert the optical signal into the temporary address code. Here, the identification code is matched with the temporary address code, so when the burner sends the optical signal to the LED lamp beads, the locations of the LED lamp beads in the lamp bead array may be obtained.

For step S703, the burner may directly package the permanent address code and the temporary address code and sends the same to the LED lamp beads, and because the LED lamp beads temporarily store the temporary address code, the permanent address code corresponding to the temporary address code may be identified through the temporary address code, so the permanent address code is further burnt into the LED lamp beads. In one embodiment, after the LED lamp beads receive the burning instruction, burning of the permanent address code may be automatically performed. In one embodiment, after the LED lamp beads receive the burning instruction, the burning instruction may be sent to the LED lamp beads through the burner or other controllers, such that the permanent address code is burnt by the LED lamp beads.

An advantage lies in that, through the step that the burner generates the optical signal and sends the optical signal to the LED lamp beads, such that the LED lamp beads convert the optical signal into the temporary address code, the locations of the LED lamp beads is identified, then the burning instruction is re-sent to the LED lamp beads, such that the temporary address code carries the permanent address code to the LED lamp beads, and the LED lamp beads are burnt according to a self-defined permanent address code. In the meantime, burning of the address codes after the LED lamp beads are assembled into the lamp bead array is realized, so the situation that because the LED lamp beads are burnt before being combined into a strip, the permanent address code is determined and consequently maintenance and replacement are inconvenient is avoided.

In one embodiment, after generating, by the burner, the optical signal and sending the optical signal to the LED lamp beads, such that the LED lamp beads convert the optical signal into the temporary address code, the method further includes: the burner obtains the temporary address code converted by the LED lamp beads according to the optical signal; the burner matches the temporary address code and the identification code; and if the temporary address code is not matched with the identification code, the optical signal identified by the LED lamp beads is incorrect.

In one embodiment, when the temporary address code is not matched with the identification code, the burner generates the optical signal again, and sends the optical signal to the LED lamp beads, such that the LED lamp beads convert the optical signal into the temporary address code and cover the previous temporary address code.

In one embodiment, the present disclosure provides an apparatus for burning an address code of LED lamp beads, applied to a burner, and including: a producing unit, configured to generate an optical signal and send the optical signal to the LED lamp beads, such that the LED lamp beads convert the optical signal into the address code; and a sending unit, configured to send a burning instruction to the LED lamp beads, such that the LED lamp beads store the address code.

Optionally, the apparatus for burning the address code of the LED lamp beads further includes: an obtaining unit, configured to obtain an identification code; and the producing unit is configured to convert the identification code into the optical signal.

Figure 6:
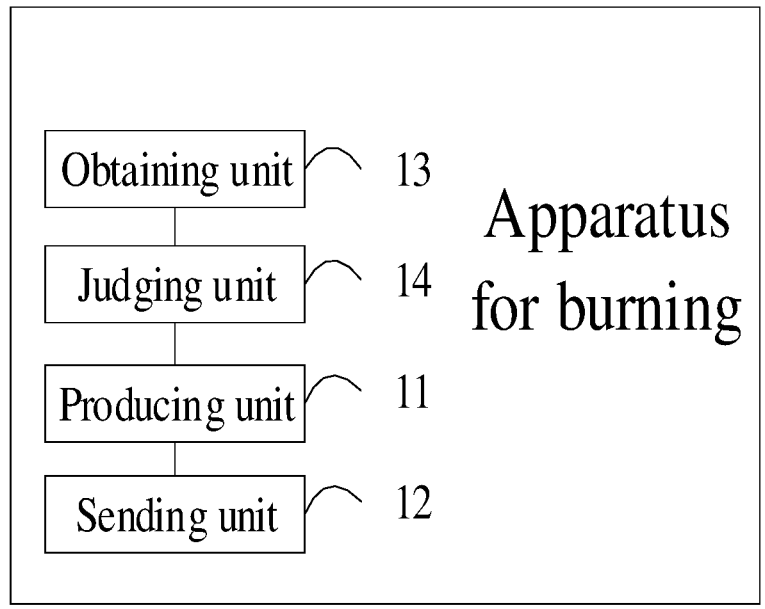
FIG. 6 is a schematic diagram of an apparatus for burning an address code of LED lamp beads in an embodiment of the present disclosure.

Optionally, as shown in FIG. 6, the apparatus for burning the address code of the LED lamp beads further includes: a judging unit, configured to perform repeated code judgment on all the identification codes; and the obtaining unit is further configured to re-obtain the identification code and cover the previous identification code when repeated codes exist in the identification codes.

Optionally, as shown in FIG. 6, according to the apparatus for burning the address code of the LED lamp beads, the obtaining unit is further configured to obtain the address code converted by the LED lamp beads according to the optical signal; the judging unit is further configured to match the address code and the identification code; the producing unit is further configured to generate the optical signal again when the address code is not matched with the identification code; and the sending unit is further configured to send the optical signal to the LED lamp beads, such that the LED lamp beads convert the optical signal into the address code and cover the previous address code.

In one embodiment, the present disclosure provides an apparatus for burning an address code of LED lamp beads, applied to a burner. As shown in FIG. 7, the apparatus includes: a producing unit, configured to generate an optical signal and send the optical signal to the LED lamp beads, such that the LED lamp beads sense the optical signal and convert the optical signal into a temporary address code; a generating unit, configured to generate a burning instruction including the temporary address code and a permanent address code corresponding to the temporary address code; and a sending unit, configured to send the burning instruction to the LED lamp beads, such that the LED lamp beads perform addressing according to the temporary address code and store the permanent address code.

In one embodiment, the present disclosure further provides a control apparatus for burning an address code of LED lamp beads, including a non-transitory computer-readable storage medium storing a computer program. A program instruction, when being executed, implements any one of the above methods for burning the address code of the LED lamp beads.

Figure 9:
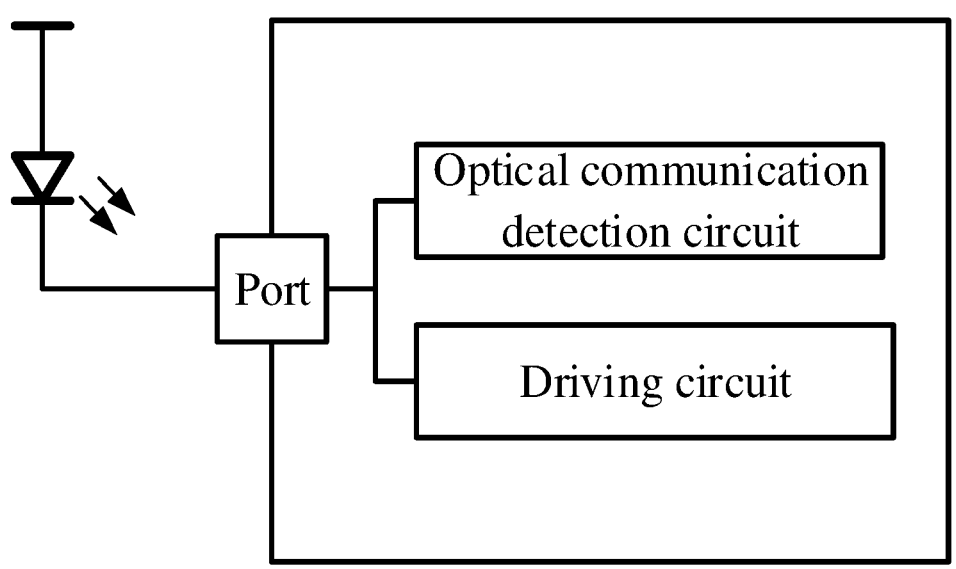
FIG. 9 is a schematic circuit diagram of an LED control apparatus in an embodiment of the present disclosure.

As shown in FIG. 9, the control apparatus for burning the address code of the LED lamp beads according to the embodiment of the present disclosure further includes an LED control apparatus. The LED control apparatus includes a driving circuit configured to generate an LED lamp bead driving signal, an optical communication detection circuit configured to detect an optoelectronic signal generated by the LED lamp beads and a port configured to be connected to the LED lamp beads, and the driving circuit and the optical communication detection circuit are respectively connected to the port.

Specifically, the LED control apparatus in the present embodiment is equivalent to a control chip of each of the LED lamp beads. In an LED array, each LED lamp bead has a corresponding control chip. The control chip may control on/off of the LED lamp beads. However, in order to achieve accurate control over each LED lamp bead, address code information matched with each LED lamp bead needs to be burnt into the control chip.

In the present embodiment, on/off control may be achieved on the LED lamp beads connected to a port of the burning control apparatus through the driving circuit. In the meantime, based on a photoelectric effect of the LED lamp beads itself, when the LED lamp beads receive burning information such as the address code in the form of the optical signal in an optical communication manner, a weak electrical signal generated by the LED lamp beads according to the optical signal may be adjusted through the optical communication detection circuit, and the address code corresponding to the LED lamp beads may be generated. Thus, a relatively high cost in adopting a traditional special burning device is lowered. In addition, flexible operation may be performed for different LED lamp beads in the LED array, and a complicated process in adopting the traditional special burning device is improved.

Preferably, the optical communication detection circuit includes a first current mirror circuit, a second current mirror circuit and a comparator, an input end of the first current mirror circuit is connected to the port, an input end of the second current mirror circuit is configured to be connected to a reference current source, and an output end of the first current mirror circuit and an output end of the second current mirror circuit are both connected to the comparator.

Specifically, because the port of the LED control apparatus may normally be connected to a red (R) LED lamp bead, a green (G) LED lamp bead, and a blue (B) LED lamp bead, the port may be labeled as OUTR/G/B. When the LED lamp beads receive the optical signal, it can generate a current signal merely at a µA level, which is relatively weak and cannot be used directly. The current signal generated by a photoelectric effect of the LED lamp beads is input into the first current mirror circuit, a benchmark reference current signal is input into the second current mirror circuit, and output of the two may generate a high level or a low level, i.e. a 1 signal or a 0 signal after passing through the comparator. The plurality of 1 signals and 0 signals may be combined into the address code information, so burning of the address code information of the LED lamp bead control apparatus is completed.

In one preferred embodiment, the corresponding address code may be generated through the electrical signal generated by the LED lamp beads according to the optical signal through the optical communication detection circuit based on the photoelectric effect of the LED lamp beads, thus finally completing burning of the address code information.

Preferably, the first current mirror circuit includes a first transistor and a second transistor, a drain electrode of the first transistor serves as the input end of the first current mirror circuit, a gate electrode of the second transistor is respectively connected to a gate electrode and the drain electrode of the first transistor, a source electrode of the first transistor and a source electrode of the second transistor are both connected to a power source, and a drain electrode of the second transistor serves as the output end of the first current mirror circuit; and the second current mirror circuit includes a third transistor and a fourth transistor, a drain electrode of the third transistor serves as the input end of the second current mirror circuit, a gate electrode of the fourth transistor is respectively connected to a gate electrode and the drain electrode of the third transistor, a source electrode of the third transistor and a source electrode of the fourth transistor are both grounded, and a drain electrode of the fourth transistor serves as the output end of the second current mirror circuit.

Figure 10:
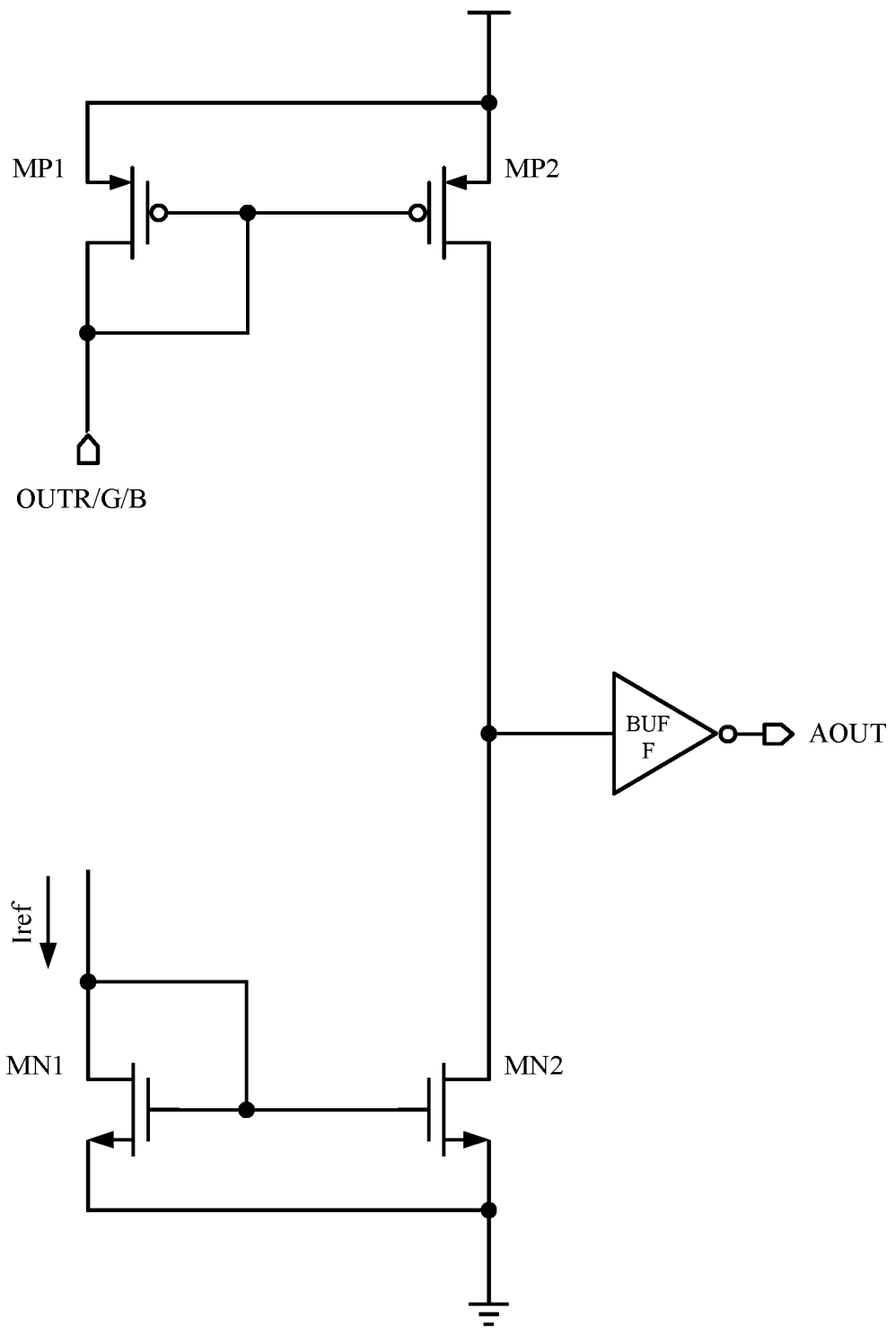
FIG. 10 is a schematic circuit diagram of an optical communication detection circuit in an embodiment of the present disclosure.

Specifically, as shown in FIG. 10, the first transistor and the second transistor may be selected from P-type transistors, which are marked as MP1 and MP2 respectively. The third transistor and the fourth transistor may be selected from N-type transistors, which are marked as MN1 and MN2 respectively. The port OUTR/G/B is connected to the drain electrode of the first transistor MP1, and a reference current Iref generated by the reference current source is connected to the drain electrode of the third transistor MN1. The first transistor MP1 and the second transistor MP2 form a current mirror, which may amplify a drain output current of the second transistor MP2, the third transistor MN1 and the fourth transistor MN2 form a current mirror, and a drain output current of the fourth transistor MN2 may be adjusted through the reference current Iref. The MP2 drain current is compared with the MN2 drain current, and a low level or a high level may be generated at a BUFF output end AOUT according to a comparison result.

In one preferred embodiment, address code information conforming to the form of the high/low level may be obtained by amplifying and shaping the weak photoelectric effect current signal through the transistors constituting the current mirror, and thus the relatively high cost and complexity in adopting the traditional special burning device for information burning of the LED lamp beads may be effectively lowered.

Figure 12:
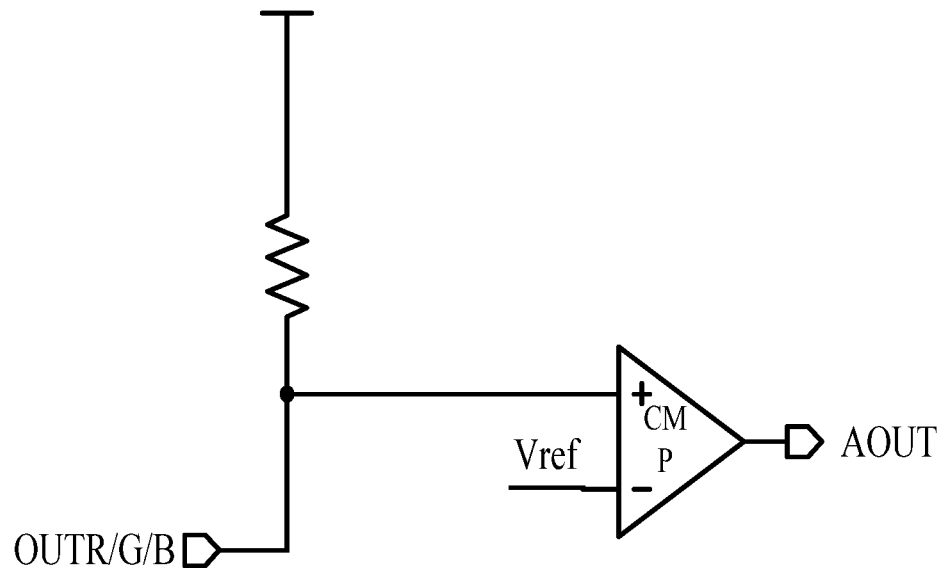
FIG. 12 is a schematic circuit diagram of an optical communication detection circuit in an embodiment of the present disclosure.

Preferably, the optical communication detection circuit includes a resistor and a comparator, a first end of the resistor is respectively connected to the port and a first input end of the comparator, a second end of the resistor is connected to a power source, and a second input end of the comparator is configured to be connected to a reference voltage source. Specifically, as shown in FIG. 12, the current signal generated by the LED lamp beads through the optical signal based on the photoelectric effect passes through a photoelectric detection resistor, the current forms a voltage drop in the resistor, the voltage drop is compared to a reference voltage Vref generated by the reference voltage source in a comparator CMP, and then a low level or a high level is generated at the output end AOUT according to a comparison result.

In one preferred embodiment, the address code information conforming to the form of the high/low level may be obtained by adjusting the weak photoelectric effect current signal through the resistor and the comparator, and thus the relatively high cost and complexity in adopting the traditional special burning device for information burning of the LED lamp beads may be effectively lowered.

Figure 13:
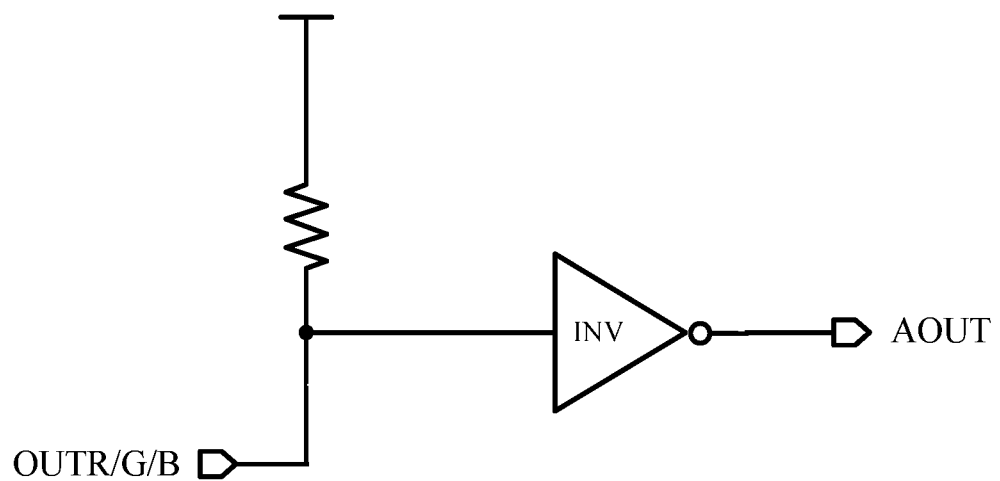
FIG. 13 is a schematic circuit diagram of an optical communication detection circuit in an embodiment of the present disclosure.

Preferably the optical communication detection circuit includes a resistor and an inverter, a first end of the resistor is respectively connected to the port and the inverter, and a second end of the resistor is connected to a power source. Specifically, as shown in FIG. 13, the current signal generated by the LED lamp beads through the optical signal based on the photoelectric effect passes through a photoelectric detection resistor, the current forms a voltage drop in the resistor, and is inverted in the inverter INV, and a low level or a high level is generated at the output end AOUT. In one preferred embodiment, the address code information conforming to the form of the high/low level may be obtained by adjusting the weak photoelectric effect current signal through the resistor and the inverter, and thus the relatively high cost and complexity in adopting the traditional special burning device for information burning of the LED lamp beads may be effectively lowered.

Figure 14:
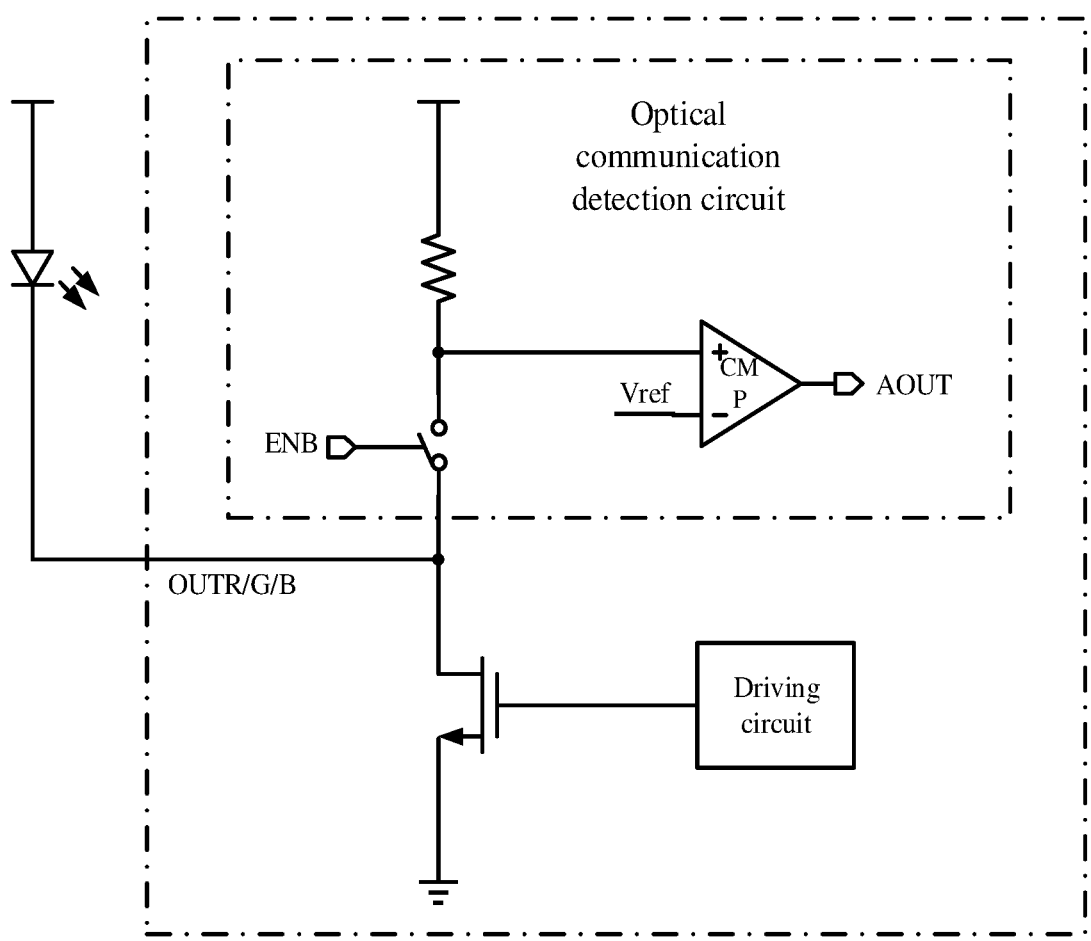
FIG. 14 is a schematic circuit diagram of an LED control apparatus in an embodiment of the present disclosure.

Preferably, the optical communication detection circuit further includes a switching device, and the switching device is arranged between the port and the input end of the first current mirror circuit, or between the port and the first end of the resistor. Specifically, as shown in FIG. 14, taking the optical communication detection circuit including the resistor and the comparator as an example for illustration, the switching device is arranged between the port OUTR/G/B and the first end of the resistor, and the switching device has an enabling end configured to be connected to an enabling signal source ENB. That is, the switching device will only be closed after receiving an enabling signal, and the address code information conforming to the form of the high/low level may be obtained by further adjusting the weak photoelectric effect current signal through the optical communication detection circuit. In one preferred embodiment, by arranging the switching device, the operation of generating the address code information in the form of the high/low level according to the photoelectric effect signal of the LED lamp beads may be performed under appropriate conditions on the basis of actual facts, so flexibility of burning the address code information of the control chips of the LED lamp beads is improved.

Figure 11:
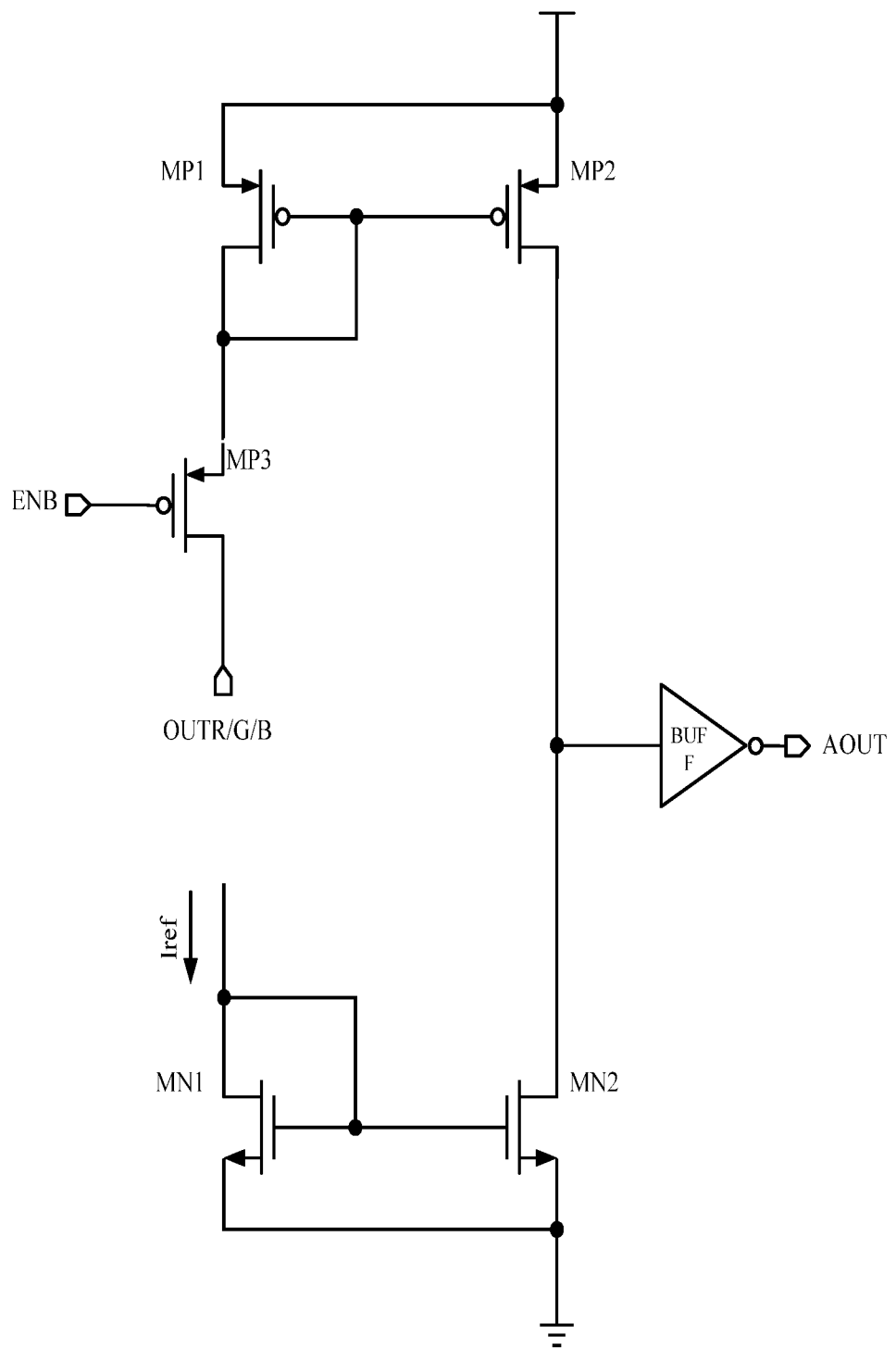
FIG. 11 is a schematic circuit diagram of an optical communication detection circuit in an embodiment of the present disclosure.

Preferably, the switching device is a switching transistor. A drain electrode of the switching transistor is connected to the port, a gate electrode of the switching transistor is configured to be connected to the enabling signal source, and a source electrode of the switching transistor is connected to the input end of the first current mirror circuit, or connected to the first end of the resistor. Specifically, as shown in FIG. 11, taking the optical communication detection circuit including the current mirror composed of the transistors as an example for illustration, the switching transistor MP3 as the switching device is arranged between the port OUTR/G/B and the input end of the first current mirror circuit. When it is determined that information burning needs to be performed using the photoelectric communication mode, the switching transistor MP3 may be conducted by raising the enabling signal source ENB, so that the photoelectric effect current signal of the LED lamp beads is input into an adjustment part of the optical communication detection circuit. In one preferred embodiment, a transistor is selected as the switching device, and is conveniently integrated onto the control chips of the LED lamp beads, and no extra device is needed.

Preferably, the apparatus further includes a driving transistor. A gate electrode of the driving transistor is connected to the driving circuit, a drain electrode of the driving transistor is respectively connected to the optical communication detection circuit and the port, and a source electrode of the driving transistor is grounded. Specifically, as shown in FIG. 14, using the transistor may realize a better driving effect of the LED lamp beads. The transistor is preferably an N-type transistor. Because currently an LED lamp bead accessing form mainly adopts a common anode, using the N-type transistor to drive achieves a stronger driving ability. In addition, because the port OUTR/G/B is equivalently directly connected to the optical communication detection circuit, processing of the photoelectric effect current signal of the LED lamp beads by the optical communication detection circuit is free of influence of the driving transistor. In one preferred embodiment, the transistor may not only be integrated onto a driving chip of the LED lamp beads, but also realize a good driving effect of the LED lamp beads.

Preferably, the port includes an R port configured to be connected to a red LED lamp bead, a G port configured to be connected to a green LED lamp bead, and a B port configured to be connected to a blue LED lamp bead. Specifically, one or more types of ports may be included, and the three types of ports may cover the R, G and B ports of the LED lamp beads. It should be noted that photoelectric effect current signals of the LED lamp beads of the three colors R, G and B may be simultaneously received or separately received according to actual needs for generating the address code information. In one preferred embodiment, for the LED lamp beads of different colors, manners of connection with the driving chips may be flexibly arranged, and flexibility of burning the address code information may be improved in an optical communication manner.

Preferably, the LED control apparatus further includes a controller. The controller is respectively connected to the driving circuit and the optical communication detection circuit. Specifically, because the LED control apparatus in the present embodiment may be one chip in form, it correspondingly includes a controller respectively connected to the driving circuit and the optical communication detection circuit.

More specifically, as shown in FIG. 15, the LED control apparatus may further include a coding/decoding circuit, an oscillator and a current bias circuit. An input end of the coding/decoding circuit may serve as a signal input end DIN of the entire chip, one output end of the coding/decoding circuit may serve as a signal output end DOUT of the entire chip. However, it should be noted that, a part of control chips may not be provided with the output end DOUT. The control chip includes three ports OUTR, OUTG and OUTB configured to be connected to different LED lamp beads respectively, three corresponding driving transistors, and a power source connecting port VDD and a grounding port GND.

In addition, the present disclosure further discloses another method for burning an address code of LED lamp beads.

The control chips are usually integrated into the LED lamp beads, and DI and DO respectively serve as signal input and signal output of each control chip and control on/off conditions of the LED lamp beads through the address code. When the two input ports DI and DO are used, the control chips of the LED lamp beads may receive a control instruction, processes the received control instruction and transfers the same to the next LED lamp bead, controller, burner or other elements. Under other circumstances, the signal output DO of the LED lamp beads may be omitted. That is, the LED lamp beads only have the DI port, and the control instruction is input into the control chip through the DI port and does not choose to output.

In one embodiment, the present disclosure provides a method for burning an address code of LED lamp beads, applied to an array including the plurality of LED lamp beads. As shown in FIG. 16, the method includes the following steps:

ST101: a random code mode is entered, and each of the LED lamp beads obtains a randomly generated random code;

ST102: the LED lamp beads send the random code to a burner so as to determine, in the burner, a permanent address code corresponding to the random code and a burning instruction including the random code and the permanent address code; and ST103: a burning mode is entered, and the LED lamp beads receive the burning instruction, perform addressing according to the random code, and store the permanent address code.

It should be noted that, the lamp bead array includes the plurality of LED lamp beads, and the plurality of LED lamp beads may be connected in series, parallel, series-parallel combination and parallel-series combination. Specific combination manners of the lamp bead array will not be limited here, and the method applies to lamp bead arrays that are combined in all possible combination manners including the above series, parallel, series-parallel combination and parallel-series combination. Before performing the present method, the lamp bead array and the burner need to be powered on, and the communication connection between the burner and the lamp bead array needs to be established. The burner may be connected to the lamp bead array through a controller, or the burner may also be connected to the array through wireless communication or other ways.

For step ST101, the LED lamp beads may enter the burning mode through various forms. In one embodiment, when the control chips of the LED lamp beads detect that the LED lamp beads are powered on and are connected to the burner, the LED lamp beads automatically enter the burning mode. Under the circumstance, the LED lamp beads may provide real-time feedback, thus achieving a higher efficiency and shorter response time. In one embodiment, the LED lamp beads may enter the random code mode by virtue of an external control system or the burner. When the external control system or the burner detects that the LED lamp beads are powered on, an instruction of entering the burning mode is sent to the control chips of the LED lamp beads, thus controlling the LED lamp beads to enter the burning mode. Under the circumstance, higher safety is achieved, and only when it is detected that the LED lamp beads are powered on and the control system or the burner sends the instruction to the LED lamp beads, the LED lamp beads may obtain the random code.

In one embodiment, the burning mode may refer to the random code mode. A random code generation module is arranged in each LED lamp bead, and in the random code mode, the random code generation module randomly generates one random code and temporarily stores the random code in the LED lamp beads. In other implementations of the present disclosure, the LED lamp beads may obtain one random code from a storage. The burner refers to a device or system that is capable of writing an instruction of burning an address of the lamp beads into the chip of the LED lamp beads. The burner may be an encoder, a burner device, or other control apparatus with a burning function.

In one embodiment, the random code is a series of numbers. Preferably, the random code is a series of binary digits. For example, a four-digit random code may be any number between 0000 and 1111. In one embodiment, the number of digits of the random code is not uniquely determined. The random code may preset an initial number of digits, i.e. in the burning mode, a random code with a number of digits is defaulted when the LED lamp beads first generate the random code. For example, initially a 10-digit random code may be generated by default. The actual number of digits of the random code is related to the quantity of the LED lamp beads. The larger the quantity of the LED lamp beads in the burned lamp bead array, the relatively larger the number of digits of the random code.

The random code may be one or more digits randomly generated by the LED lamp beads. It may be a series of binary digits, or may be a combination of other numbers, letters or symbols, and the random code may be a code capable of representing a temporary address of the LED lamp beads. In one embodiment, the random code is a basic principle to realize that the LED lamp beads on the same series branch or the parallel branch emit light according to a specified logic, and the random code may be some information burnt by a gate circuit in the control chips of the LED lamp beads. The information represents the "address" of the LED lamp beads.

For step ST102, because the LED lamp beads are not aware of the quantity of the LED lamp beads in the lamp bead array or locations of the LED lamp beads, and data cannot be transmitted between the lamp beads, when the address is burnt, the LED lamp beads need to send the random code to the burner or other controller, so that all the random codes are processed and thus the locations and quantity of the LED lamp beads may be determined through identification of the random codes. Because the random code is generated by the lamp beads, the random code may be considered as the address code of the LED lamp beads, and an effect of the address code is to make the burner be aware of the locations of the LED lamp beads, so as to distinguish each LED lamp bead. Because all the LED lamp beads in the lamp bead array randomly generate the random codes, the random codes of the LED lamp beads in the lamp bead array is in disorder, so the random code may be used as the temporary address code of the LED lamp beads. After the burner receives the random code sent by the LED lamp beads, it may be aware of the locations of the LED lamp beads. The permanent address codes correspond to the LED lamp beads in a one-to-one mode, at the moment, the burner may determine the permanent address code corresponding to the random code, integrate the permanent address code and the temporary address code into the burning instruction, and send the permanent address code and the temporary address code to the LED lamp beads in a package.

For step ST103, because the LED lamp beads temporarily store the random code generated by it, the LED lamp beads may identify the permanent address code corresponding to the LED lamp beads through the random code, thus realizing burning of the permanent address code into the LED lamp beads. The permanent address code may be determined by the burner according to actual locations of the LED lamp beads in the lamp bead array. The permanent address code may represent a sequence of locations of the LED lamp beads in the lamp bead array. A format of the burning instruction may include: the random code+the permanent address code. When the LED lamp beads receive the burning instruction, it may identify the permanent address code through the random code in the lamp beads, so the permanent address code is burnt into the LED lamp beads. For step ST103, addressing refers to finding the permanent address code according to the random code in the burning instruction.

In one embodiment, the burning instruction is also integrated with an instruction of burning the permanent address code into the control chips of the lamp beads, and after the LED lamp beads receive the burning instruction, the permanent address code is automatically burnt into the lamp beads. For example, a series circuit includes 100 LED lamp beads, the random code of a lamp bead No. 1 is 0111101, the 100 permanent address codes may respectively be 0000001-1100100, and then the burning instruction may include 0111101+0000001. At the moment, the lamp bead No. 1 may identify the random code 0111101 and then identify the permanent address code 0000001 corresponding to the random code. Of course, the permanent address code may also be the same as the random code. That is, the random code is directly taken as the permanent address code to be burnt into the LED lamp beads, but the method will still convert the random code and the permanent address code when the lamp bead controls the program. Here, storing the permanent address code by the LED lamp beads refers to that after the LED lamp beads receive the burning instruction, the permanent address code is burnt into the lamp beads through burning control by the controller of the burner, other external controller or a controller of a lamp strip, thus realizing writing of the permanent address code of the lamp beads.

In the present disclosure, when the address code of the LED lamp beads is burnt, the LED lamp beads first obtain one random code representing the temporary address code, the random code is then sent to the burner, such that the burner determines the location of the lamp beads according to the random code, the burner packages the permanent address code and the random code and then sends the same to the lamp beads, and the lamp beads perform addressing through the random code, such that the permanent address code is burnt into the LED lamp beads. According to the present disclosure, burning may be performed after the LED lamp beads are combined into the lamp bead array. When the LED lamp beads are damaged, the lamp beads may be replaced with any lamp bead of the same model and no requirement is raised for fixed locations of the lamp beads, and therefore, inconvenience in LED lamp bead maintenance caused by LED lamp beads at fixed locations is avoided, and one-by-one burning of the LED lamp beads in an LED lamp bead burning method is avoided, thus reducing working procedures.

In one embodiment, the method further includes: the LED lamp beads determine a lamp bead on/off condition representing the random code according to the random code; the LED lamp beads are run according to the lamp bead on/off condition, such that the burner identifies the lamp bead on/off condition and converts the LED lamp bead on/off condition into the random code. For example, the random code may be 0101, the LED lamp bead on/off condition of the corresponding LED lamp bead is off/on/off/on, and the LED lamp beads merely need to execute an action of off/on/off/on. When the random code is 1010, the LED lamp bead on/off condition of the corresponding LED lamp bead is on/off/on/off, and the LED lamp beads merely need to execute an action of on/off/on/off. Correspondingly, the burner merely needs to identify the on/off condition of the LED lamp beads. After the burner identifies the LED lamp bead on/off condition, it converts the LED lamp bead on/off condition into the random code, thus realizing sending of the random code. A principle of converting the LED lamp bead on/off condition into the random code is the same as a principle of converting the random code into the LED lamp bead on/off condition. For example, when the burner identifies the LED lamp bead on/off condition of on/off/on/off, it may convert the LED lamp bead on/off condition of on/off/on/off into the random code 1010. An advantage lies in that, the lamp bead on/off condition is used to represent the random code, communication with the burner is realized by changing a form of the LED lamp bead on/off condition, the burner identifies the on/off of the LED lamp beads, and then burner converts the lamp bead on/off condition into the random code.

In one embodiment, according to the present disclosure, duration of the on/off conditions of the LED lamp beads may be set in the control chips of the LED lamp beads. For example, when the identification code is 0101, the LED lamp beads may be set to be off for 1 second, on for 1 second, off for 1 second, and on for 1 second. For another example, when the identification code is 1010, the LED lamp beads may be set to be on for 1 second, off for 1 second, on for 1 second, and off for 1 second.

In one embodiment, the present disclosure may establish an electrical connection between the lamp bead array and the burner, the LED lamp beads directly send the random code to the burner through an electrical signal. After the burner receives the electrical signal, it converts the electrical signal into the random code.

In one embodiment, the LED lamp beads are multi-color LED lamp beads, and the sending, by the LED lamp beads, the random code to the burner includes: the LED lamp beads determine grayscale values of chips of different colors in the LED lamp beads according to the random code; and the chips emit light at the corresponding grayscale values such that the burner identifies light emitting colors of the LED lamp beads and converts the light emitting colors into the random code. For example, the random code may be ABC, where A is 11111111, B is 00000000, and C is 00000000. A pixel corresponding to light emission by a red chip is 11111111, a pixel corresponding to light emission by a green chip is 00000000, and a pixel corresponding to light emission by a blue chip is 00000000. At the moment, a light emission condition of the LED lamp beads is that red light is emitted. When the burner identifies that the LED lamp beads emit the red light, it converts the red light into the random code ABC, where A is 11111111, B is 00000000, and C is 00000000. Here, the multi-color LED lamp beads may also be an RGBW lamp bead, and a grayscale value of a white LED lamp bead emitting light is added to the random code correspondingly. An advantage lies in that, the grayscale values of the light emitting colors are used to represent the random code, communication with the burner is realized by changing the light emitting colors of the multi-color LED lamp beads, the burner identifies the light emitting colors of the LED lamp beads, and then the burner converts the light emitting colors into the random code.

Repeated codes may exist in the random codes generated by different LED lamp beads. For example, when there are 10 LED lamp beads, and the random codes are four-digit binary numbers, a probability that repeated codes exist in the random codes generated by different LED lamp beads is 97.4%. For another example, when there are 10 LED lamp beads, and the random codes are five-digit binary numbers, the probability that repeated codes exist in the random codes generated by different LED lamp beads is 80%. For another example, when there are 10 LED lamp beads, and the random codes are six-digit binary numbers, the probability that repeated codes exist in the random codes generated by different LED lamp beads is 53%. For another example, when there are 10 LED lamp beads, and the random codes are seven-digit binary numbers, the probability that repeated codes exist in the random codes generated by different LED lamp beads is 17%. For another example, when there are 10 LED lamp beads, and the random codes are eight-digit binary numbers, the probability that repeated codes exist in the random codes generated by different LED lamp beads is 9%. For another example, when there are 10 LED lamp beads, and the random codes are nine-digit binary numbers, the probability that repeated codes exist in the random codes generated by different LED lamp beads is 4.4%. Therefore, the probability that repeated codes exist in the random codes generated by different LED lamp beads is in inverse ratio to the number of digits of the random codes. That is, the higher the number of digits of the random codes, the lower the probability that repeated codes exist in the random codes generated by different LED lamp beads. When the number of digits of the random codes is large enough, the probability that repeated codes exist in the random codes approaches 0. Repeated codes refer to that the random codes generated by at least two LED lamp beads are the same in the identification codes generated by all the LED lamp beads.

As shown in FIG. 17, in the embodiment, the method for burning the address code of the LED lamp beads is applied to a lamp bead array including a plurality of LED lamp beads and includes the following steps:

ST201: the method enters a random code mode, each of the LED lamp beads obtains a randomly generated random code;

ST202: the random code is sent to the burner so that repeated code judgment is performed on all random codes in the burner; and ST203: when the burner judges that no repeated codes exist in all the random codes, the LED lamp beads receive a burning instruction determined by the burner and including a permanent address code corresponding to the random code and the random code, perform addressing according to the random code, and accept the burner's burning the permanent address code into the control chips of the LED lamp beads; and when the burner judges that repeated codes exist in all the random codes, the LED lamp beads receive the repeated code instruction sent by the burner, and re-generates the random code according to the repeated code instruction. The repeated code instruction refers to an instruction sent by the burner to the LED lamp beads on re-generating the random code.

It should be noted that, for step ST202, the LED lamp beads themselves may generate the random code, but cannot perform repeated code judgment. Repeated code judgment may be performed in the burner, or may be in a controller of the LED lamp beads, or may be in a controller of the burner. Here, the controller of the burner belongs to the scope of burners, and performing repeated code judgment in other controllers may be considered as the same technical means of performing repeated code judgment. When the burner judges that repeated codes exist in all the random codes, the LED lamp beads re-generate the random code, and re-send the random code to the burner. The operation is repeated until no repeated codes exist in the random codes. If repeated code judgment is not performed, when repeated codes exist in the random codes, the permanent address codes of a plurality of LED lamp beads will be the same in the lamp bead array. An advantage lies in that, the situations that the random codes generated for the LED lamp beads are repeated so the permanent address codes burnt in the LED lamp beads are the same, that light emission conditions of the LED lamp beads are always the same and cause disorder of the light effect, and that a light control effect is lowered than expectation are avoided.

In one embodiment, after the LED lamp beads receive the repeated code instruction sent by the burner, all the LED lamp beads re-generate the random codes, and all the LED lamp beads re-send the re-generated random codes to the burner for repeated code judgment, until no repeated codes exist in all the random codes. Because when the number of digits of the random codes is larger, the probability that repeated codes exist in the random codes generated by different LED lamp beads is lower, and when number of digits of the random codes is large enough, the probability that repeated codes exist in the random codes generated by different LED lamp beads approaches 0. Here, instead of making the specific LED lamp beads with the repeated codes re-generate the random codes, all the LED lamp beads re-generate the random codes. An advantage lies in that, the complexity of the repeated code instruction is relatively low, a processing volume of the control chips of the LED lamp beads is lowered, and running of a burning program is quickened.

In one embodiment, the random code initially sent by the LED lamp beads has a default number of digits, and if repeated codes exist in all the random codes, the burner calculates the quantity of all the LED lamp beads; and then the number of digits of the random codes is re-determined according to the quantity of the LED lamp beads, and the re-determined number of digits in the random code is sent to the LED lamp beads, such that the LED lamp beads re-generate the random code according to the re-determined number of digits of the random codes. Optimally, the method for burning the address code of the LED lamp beads further includes: after receiving the repeated code instruction sent by the burner, the number of digits of the random codes re-generated by all the LED lamp beads is larger. That is, when repeated codes exist, if the number of digits of the random codes is larger, the probability of repeated codes is lower. At the moment, the probability of no repeated codes may be increased by increasing the number of digits of the random codes. For example, when there are 10 LED lamp beads, and the random codes are five-digit binary numbers, the probability that repeated codes exist in the random codes generated by different LED lamp beads is 80%. If the number of digits is increased to six, the probability that repeated codes exist in the random codes generated by different LED lamp beads is 53%. Of course, the number of digits may be directly increased to nine, and the probability that repeated codes exist in the random codes generated by different LED lamp beads is 4.4%. At the moment, the probability of repeated codes is relatively low. An advantage lies in that, the situations that the number of digits of the initially generated random codes is excessively high, a processing volume of a system is increased, and system running is slow can be avoided; and by gradually increasing the random codes, the number of digits of the random codes may be reduced to the greatest extent, and the memory occupied by the random codes is reduced to the greatest extent.

In one embodiment, after the LED lamp beads receive the repeated code instruction sent by the burner, only the LED lamp beads with repeated random codes re-generate the random codes, and resend the re-generated random codes to the burner; and operation is repeated until no repeated codes exist in the random codes. Because all the LED lamp beads are connected in series or parallel, the instructions received by all the LED lamp beads must be the same, but only the first lamp beads may identify the repeated code instruction. For example, the random codes generated by two first lamp beads are both 0001100111. At the moment, the burner sends the repeated code instruction to the LED lamp beads. The repeated code instruction includes: the repeated random code (0001100111) and an instruction on re-generating the random code. All the LED lamp beads identify whether the repeated random codes are the random codes generated thereby upon receiving the repeated code instruction. Here, when the first lamp beads receive the repeated code instruction, they may identify the repeated random codes, the first lamp beads re-generate the random code, the first lamp beads send the re-generated random codes to the burner for repeated code judgment, and the operation is repeated until no repeated codes exist in the random codes. An advantage lies in that, only the LED lamp beads having random code repetition re-generate random codes, so the processing volume of the burner on the random codes is reduced.

In one embodiment, different LED lamp beads determine different random codes according to different process errors. In one embodiment, a random code generation algorithm may be preset in the control chip or the controller of the lamp bead, and the control chip includes a random code generation module. When the LED lamp beads are powered on, the random code generation algorithm runs to make the random code generation module of the lamp bead generate a random code. It should be noted that each lamp bead in the lamp bead array will generate a random code.

In one embodiment, a random code generation circuit may be set, and the random code is generated in the lamp bead through the random code generation circuit. In one embodiment, the random code generation circuit includes an inverting oscillator. An oscillation frequency of the inverting oscillator is mainly determined by CMOS process parameters, and the CMOS process parameters may vary due to different processes. Even in the same process, there may also be slight deviation among devices prepared under the parameters. If processing technologies are different, the deviation will become larger. The number of cycles of the oscillation frequency of the inverting oscillator within the set time is recorded. Of course, in another embodiment of the present disclosure, the number of oscillations of the inverting oscillator in different set times may be recorded. Here, the lower N bits of a count value of the inverting oscillator are taken as the random code. The deviation of the devices prepared under the same process parameters may be too small. Optionally, the count value of the inverting oscillator is amplified by a set multiple, and the lower N bits of the amplified count value are taken as the random code. It should be noted that the value of N here is related to the preset number of bits of the random code. For example, when the count value of the inverting oscillator within 1 second is 11011101101101000100, the lower eight bits of data may be taken as the random code, that is, the random code is 01000100; when the count value of the inverting oscillator within 1 second is 11011011101111100111, the lower nine bits of data may be taken as the random code, that is, the random code is 111100111. An advantage lies in that, the random code is generated by the random code generation circuit integrated with the inverting oscillator by utilizing slight difference in the processing technology of the inverting oscillator.

In one embodiment, a temperature sensor is included in the random code generation circuit, temperature of control circuit boards of different lamp beads is measured by different temperature sensors, and the lower N bits of the numerical value of the temperature sensor are taken as the random code. Optionally, the value of the temperature sensor is amplified by set times, and the lower N bits of the amplified value are taken as the random code.

In one embodiment, a noise generator is included in the random code generation circuit, a noise is randomly generated by different noise generators, and a value of the noise is recorded. The value of the noise is amplified by set times, and the lower N bits of the amplified value are taken as the random code.

In one embodiment, the present disclosure provides an apparatus for burning an address code of LED lamp beads, as shown in FIG. 20, applied to the LED lamp beads. As shown in FIG. 20, the apparatus includes a generating unit 111, configured to obtain a randomly generated random code after entering a random code mode; a sending unit 112, configured to send the random code to a burner so as to determine a permanent address code corresponding to the random code and a burning instruction including the random code and the permanent address code in the burner; and a burning unit 113, configured to receive the burning instruction, perform addressing according to the random code, and store the permanent address code.

Optionally, as shown in FIG. 21, the sending unit 112 is further configured to send the random code to the burner to perform repeated code judgment on all random codes in the burner; the receiving unit 114 is configured to receive the repeated code instruction sent by the burner and re-obtain the random code according to the repeated code instruction.

As shown in FIG. 22, the apparatus further includes a converting unit 115 configured to determine an LED lamp bead on/off condition representing the random code according to the random code; and a controlling unit 116 configured to control the LED lamp beads to run according to the lamp bead on/off condition such that the burner identifies the lamp bead on/off condition and converts the lamp bead on/off condition into the random code.

In one embodiment, the present disclosure provides a method for burning an address code of LED lamp beads, applied to a burner, and including:

ST401: the burner receives a random code sent by the LED lamp bead;

ST402: the burner determines a permanent address code corresponding to the random code and a burning instruction including the random code and the permanent address code; and ST403: the burner sends the burning instruction to the LED lamp beads such that the LED lamp beads store the address code.

Because the LED lamp beads are not aware of the quantity of the LED lamp beads in the lamp bead array or locations of the LED lamp beads, for step ST401, the burner receives the random code sent by the LED lamp beads, and determines the locations and quantity of the LED lamp beads by identifying the random codes. In one embodiment, the LED lamp beads may send the random code in a form of on/off, a photosensitive element is set in the burner, and the on-off condition of the LED lamp beads is obtained through the photosensitive element. Sending, by the burner, the random code sent by all LED lamp beads includes: the LED lamp bead on/off condition of the LED lamp beads representing the random code is identified; and the burner converts the on/off condition of the LED lamp beads into the random code. That is to say, the photosensitive element cannot directly obtain the random code generated by the LED lamp beads, but it may identify the on/off condition of the LED lamp beads, and then record the on/off condition of the LED lamp beads and convert the on/off condition into the random code of the LED lamp beads, which is equivalent to a reverse process of the LED lamp beads sending out random codes. It should be noted that the photosensitive element of the burner may be one or more cameras. When the photosensitive element is the plurality of cameras, the plurality of cameras may correspond to the locations of the LED lamp beads respectively. In certain cases, the photosensitive element may also be a photosensitive sensor.

For step ST402, the burner integrates the permanent address code and the random code into the burning instruction, after obtaining the random codes, the burner may be aware of the quantity of the LED lamp beads and the locations of the LED lamp beads in the array. For example, a series circuit includes 100 LED lamp beads, but the burner does not know there are 100 LED lamp beads. When all the LED lamp beads send the random codes to the burner, the burner determines the quantity of the LED lamp beads to be 100 according to the quantity of the random codes. At the moment, the burner burns the permanent address codes into the 100 LED lamp beads separately in sequence, achieving the sequencing of the LED lamp beads. A format of the burning instruction may include: the random code+the permanent address code. For example, the burning instruction may be 1010+0001, 1010 is the random code, and 0001 is the permanent address code. For step ST140, when the LED lamp beads receive the burning instruction, the LED lamp beads with the generated random code of 1010 may identify the burning instruction, so that the permanent address code of 0001 is obtained, and the permanent address code of 0001 is burnt into the LED lamp beads.

For step ST403, because the LED lamp beads temporary store the random codes, the LED lamp beads may identify the random code in the burning instruction, so that the corresponding permanent address code is obtained through the random code, and the permanent address code is burnt into the control chip of the LED lamp beads.

An advantage lies in that, when the LED lamp beads are damaged, the locations of the LED lamp beads may be quickly found according to the permanent address code. In addition, the address codes of the LED lamp beads may be arranged through the permanent address codes, so that the address codes are clearer in digital logic. When burning the address codes of the LED lamp beads, the random code representing the temporary address code is first obtained, then the burning instruction including the random code and the permanent address code is confirmed, and the instruction is sent to the LED lamp beads, so that the LED lamp beads obtain the permanent address code according to the random code and the permanent address code is into the LED lamp bead. When a lamp bead is damaged, the lamp bead may be replaced with any lamp bead of the same model and no requirement is raised for fixed locations of the lamp beads. Therefore, inconvenience in LED lamp bead maintenance caused by LED lamp beads at fixed locations is avoided, and one-by-one burning of the LED lamp beads in an LED lamp bead burning method is avoided, thus reducing working procedures.

In the embodiment, as shown in FIG. 19, the method for burning an address code of the LED lamp beads, applied to the burner, includes the following steps:

ST501: the burner receives a random code sent by the LED lamp beads;

ST502: the burner performs repeated code judgment on all the random codes;

ST503: when no repeated codes exist in the random codes, the burner determines a permanent address code corresponding to the random code and a burning instruction including the random code and the permanent address code; and ST504: the burner sends the burning instruction to the LED lamp bead such that the LED lamp beads perform addressing according to the random code and store the permanent address code.

For step ST502, the burner performs repeated code judgment on all the random codes; when no repeated codes exist in the random codes, the burner sends a burning instruction including a permanent address code corresponding to the random code and the random code to the LED lamp bead so as to burn the permanent address code into the LED lamp beads; when repeated codes exist in the random codes, the burner sends a repeated code instruction to the LED lamp beads such that the LED lamp bead re-generate the random code. For example, the random codes generated by two first lamp beads are both 0001100111. At the moment, the burner sends the repeated code instruction to the LED lamp beads. It should be noted that a format of the repeated code instruction is not limited here, but the repeated code instruction must include the random code with the repeated codes and an instruction of re-generating the random code. For example, the format of the repeated code instruction may include: 0001100111+the instruction of re-generating the random code. The 0001100111 refers to the repeated random codes. When the lamp beads receive the repeated code instruction, they may identify whether the repeated random codes are the random codes generated thereby, and then obtain the instruction of re-generating the random code corresponding to the LED lamp beads. An advantage lies in that, the situations that the random codes generated for the LED lamp beads are repeated so the permanent address codes burnt in the LED lamp beads are the same, that light emission conditions of the LED lamp beads are always the same and cause disorder of the light effect, and that a light control effect is lowered than expectation are avoided.

A probability of repeated codes is relatively large when the quantity of the LED lamp beads is larger and the number of digits of the random code is lower. When the burner receives the random codes sent by all the LED lamp beads, repeated code judgment needs to be performed on all random codes. In the case of repeated codes, the LED lamp beads need to re-generate the random codes. It should be noted that, repeated code judgment may be performed by a controller of the burner or a controller controlling the burner and the LED lamp beads. In one embodiment, when the burner detects that repeated codes exist in the random codes, the burner sends the repeated code instruction to all the LED lamp beads, such that all the LED lamp beads re-generate the random codes, and the burner re-obtains the random codes re-generated by all the LED lamp beads and performs repeated code judgment on the random codes re-generated by all the LED lamp beads until repeated codes exist in all the random codes.

In one embodiment, when the burner detects that repeated codes exist in the random codes generated by a plurality of first lamp beads, the burner sends the repeated code instruction to all the LED lamp beads, such that the first lamp beads re-generate the random codes after receiving the repeated code instruction, and the burner re-obtains the random codes re-generated by the first lamp beads and performs repeated code judgment on the random codes re-generated by the first lamp beads until repeated codes exist in all the random codes. Because all the LED lamp beads are connected in series or parallel, the instructions received by all the LED lamp beads must be the same, but only the first lamp beads may identify the repeated code instruction.

If the random codes generated are relatively concentrated in a numerical region, errors may occur in following burning or identification processes. In one embodiment, when the burner detects that the random codes are concentrated in a numerical region, a regional repeated code instruction is sent, such that all random codes in the numerical region are re-generated by the LED lamp beads corresponding to all the random codes. For example, the random codes include: 0001100100, 0001100101, 0001100110 and 0001100111, and then the burner may send a 0001100XXX+ random code re-generating instruction. At the moment, random codes with the first seven digits being 0001100 in all the random codes are re-generated. An advantage lies in that, the random codes in the numerical region where the random codes are relatively concentrated are re-generated, an identification error of the random codes caused by concentrated identification codes is avoided, and an accuracy of subsequent optical signal identification is improved.

In order to improve accuracy of the random coded regenerated, specifically, when it is detected that there are repeated codes in the random codes, the random code being the repeated code and all random codes not used are obtained, the random code being the repeated code and all the random codes not used are sent to the LED lamp beads, such that the LED lamp beads with the random code being the repeated code randomly re-generates one random code from all the random codes not used and the repeated code. That is, the repeated code instruction sent by the burner does not cause the first lamp beads to generate the random codes from all possible random codes, but from all the random codes not used of the LED lamp beads and the random codes with repeated codes. An advantage lies in that, the situation that the re-generated random codes are re-compared with all the re-generated codes, which increases the load of a system is avoided; and the re-generated random codes are directly compared to confirm whether the re-generated random codes are repeated codes, which improves the efficiency.

In one embodiment, repeated random codes include a plurality of sets of different random codes. For example, as shown in the following table, the random codes of two second lamp beads are 11101010010101, the random codes of three third lamp beads are 00000000011010 and the random codes of two fourth lamp beads are 10010100111111. The repeated code instruction needs to include a second repeated code instruction: 11101010010101+the instruction of re-generating the random code; a third repeated code instruction: 00000000011010+the instruction of re-generating the random code; and a fourth repeated code instruction: 10010100111111+the instruction of re-generating the random code. When the LED lamp beads are combined in parallel, the complete repeated code instruction needs to be sent to every LED lamp bead, but when the LED lamp beads are combined in series, the complete repeated code instruction does not need to be sent to every LED lamp bead. When the LED lamp beads are combined in series, that is, control output of the previous LED lamp bead is connected to control input of the next LED lamp bead, for example, the second lamp beads, the third lamp beads and the fourth lamp beads are connected in the same circuit in series, the repeated code instruction sent by the burner includes the second repeated code instruction, the third repeated code instruction and the fourth repeated code instruction. Because there are only two second lamp beads, when the first second lamp bead identifies the second repeated code instruction, it re-generates the random code and deletes the second repeated code instruction corresponding to the second lamp beads in the repeated code instruction, so the second second lamp bead will not identify the repeated code instruction. Because there are three third lamp beads, when the first third lamp bead identifies the third repeated code instruction, it re-generates the random code without deleting the third repeated code instruction; and when the second third lamp bead identifies the third repeated code instruction, it re-generates the random code and deletes the third repeated code instruction, so the third third lamp bead will not identify the repeated code instruction. Similarly, because there are only two fourth lamp beads, when the first fourth lamp bead identifies the fourth repeated code instruction, it re-generates the random code and deletes the fourth repeated code instruction corresponding to the fourth lamp beads in the repeated code instruction, so the second fourth lamp bead will not identify the repeated code instruction.

Optionally, In one embodiment, the random code initially sent by the LED lamp beads has a default number of digits, and the method for burning the address code of the LED lamp beads further includes: if repeated codes exist in all the random codes, the burner calculates the quantity of all the LED lamp beads; and then the number of digits of the random codes is re-determined according to the quantity of the LED lamp beads, and the re-determined number of digits in the random code is sent to the LED lamp beads, such that the LED lamp beads re-generate the random code according to the re-determined number of digits of the random codes. For example, when there are 10 LED lamp beads, and the random codes are nine-digit binary numbers, the probability that repeated codes exist in the random codes generated by different LED lamp beads is 4.4%. At the moment, the number of digits of the random codes may be set to be 10 digits, and the probability that repeated codes exist in the random codes is very low. Even if there are certain repeated codes, an overall effect of the lamp bead array will not be affected; and the random codes with reasonably determined number of digits will not occupy relatively large resources of the system. For another example, when there are 20 LED lamp beads, in order to reduce the probability that repeated codes exist in the random codes, the number of digits of the random codes may be set to be 20. Here, after calculating the quantity of the LED lamp beads, the burner may send the quantity of the LED lamp beads to the LED lamp beads, and the LED lamp beads re-determine the number of digits of the random codes and re-generate the random codes according to the quantity of the LED lamp beads. Under normal conditions, the number of digits of the re-determined random codes is greater than the number of digits of the initial random codes. An advantage lies in that, the situations that the number of digits of the initially generated random codes is excessively high, a processing volume of a system is increased, and system running is slow can be avoided; and by gradually increasing the random codes, the number of digits of the random codes may be reduced to the greatest extent, and the memory occupied by the random codes is reduced to the greatest extent.

In one embodiment, the present disclosure provides an apparatus for burning an address code of LED lamp beads, applied to a burner. As shown in FIG. 27, the apparatus includes a receiving unit 121, configured to receive a random code sent by the LED lamp beads; a converting unit 122, configured to determine a permanent address code corresponding to the random code and a burning instruction including the random code and the permanent address code; and a sending unit 123, configured to send the burning instruction to the LED lamp bead such that the LED lamp beads perform addressing according to random code and store the permanent address code.

Optionally, the apparatus further includes: a judging unit 124, configured to perform repeated code judgment on all the random codes; and the sending unit 123 is configured to send a repeated code instruction to the LED lamp beads such that the LED lamp beads re-generate the random code when repeated codes exist in the random codes.

In one embodiment, the present disclosure provides a method for burning an address code of LED lamp beads. As shown in FIG. 18, the method is applied to an array including a plurality of LED lamp beads and includes ST401: the method enters a random code mode, each of the LED lamp beads obtains a randomly generated random code;

ST402: the LED lamp beads determine a temporary address code according to the random code;

ST403: the LED lamp beads send the temporary address code to the burner so as to determine, in the burner, a permanent address code corresponding to the temporary address code and a burning instruction including the temporary address code and the permanent address code; and ST404: the method enters a burning mode, and the LED lamp beads receive the burning instruction, perform addressing according to the temporary address code, and accept the burning of the permanent address code by the burner into a control chip of the LED lamp beads.

Here, after each of the LED lamp beads obtains the randomly generated random code, the embodiment is different from steps ST101-ST103 in that, in the embodiment, the LED lamp beads first determine the temporary address code according to the random code, and then sends the temporary address code to the burner. The role of the temporary address code is to represent the temporary address of the lamp beads. The temporary address code may be different from the random code. Before sending the random code to the burner, it is processed by a control chip or controller of the lamp bead and then converted into a temporary address code representing an address of the lamp beads; the temporary address code may also be the same as the random code. It should be noted that, in the embodiment, after the random code is converted into the temporary address code, a function of the temporary address code is the same as that of the random code sent to the burner in the foregoing embodiment. Therefore, the method involved in the above embodiment, on the premise that no contradiction occurs, is also applicable to the embodiment.

In one embodiment, after step ST402, the method further includes: the temporary address code is sent to the burner so that repeated code judgment is performed on all temporary address codes in the burner; when the burner judges that no repeated codes exist in all the temporary address codes, the LED lamp beads receive a burning instruction determined by the burner and including a permanent address code corresponding to the temporary address code and the temporary address code, perform addressing according to the temporary address code, and accept the burner's burning the permanent address code into the control chips of the LED lamp beads; and when the burner judges that repeated codes exist in all the temporary address codes, the LED lamp beads receive the repeated code instruction sent by the burner, and re-generate the temporary address code according to the repeated code instruction. The repeated code instruction refers to an instruction sent by the burner to the LED lamp beads of re-generating the temporary address code.

In one embodiment, sending, by the LED lamp beads, the temporary address code to the burner includes: the LED lamp beads determine a lamp bead on/off condition representing the random code according to the temporary address code; and the LED lamp beads run according to the lamp bead on/off condition such that the burner identifies the lamp bead on/off condition and converts the lamp bead on/off condition into the temporary address code.

In one embodiment, the LED lamp beads are multi-color LED lamp beads, and sending, by the LED lamp beads, the temporary address code to the burner includes: the LED lamp beads determine grayscale values of light emitting chips of different colors in the LED lamp beads according to the temporary address code; and the light emitting chips of different colors emit light at the corresponding grayscale values such that the burner identifies light emitting colors of the LED lamp beads and converts the light emitting colors into the temporary address code.

In one embodiment, after the LED lamp beads receive the repeated code instruction sent by the burner, all the LED lamp beads re-obtain the temporary address codes, and cover the previous temporary address codes.

In one embodiment, after the LED lamp beads receive the repeated code instruction sent by the burner, all the LED lamp beads re-obtain the random codes, and cover the previous random codes.

According to the present disclosure, when the address code of the LED lamp beads is burnt, the LED lamp beads first obtain a representative random code, the random code is converted into the temporary address code, then the temporary address code is sent to the burner such that the burner determines locations of the lamp beads according to the temporary address code, the burner packages the permanent address code and the temporary address code and sends the same to the lamp beads, and the lamp beads perform addressing through the temporary address code, such that the permanent address code is burnt into the LED lamp beads. According to the present disclosure, burning may be performed after the LED lamp beads are combined into a lamp bead array. When a lamp bead is damaged, the lamp bead may be replaced with any lamp bead of the same model and no requirement is raised for fixed locations of the lamp beads. Therefore, inconvenience in LED lamp bead maintenance caused by LED lamp beads at fixed locations is avoided, and one-by-one burning of the LED lamp beads in an LED lamp bead burning method is avoided, thus reducing working procedures.

In one embodiment, the present disclosure provides an apparatus for burning an address code of LED lamp beads. The apparatus is applied to the LED lamp beads, and includes a generating unit 111, configured to obtain a randomly generated random code after entering a random code mode; a converting unit 115, configured to determine a temporary address code according to the random code; a sending unit 112, configured to send the temporary address code to a burner so as to determine a permanent address code corresponding to the temporary address code and a burning instruction including the temporary address code and the permanent address code in the burner; and a burning unit 113, configured to receive the burning instruction, perform addressing according to the temporary address code, and store the permanent address code.

In one embodiment, the present disclosure provides an LED lamp, including at least one LED lamp bead. The LED lamp bead includes a control chip, the control chip includes a non-transitory computer-readable storage medium storing a computer program, and a program instruction, when being executed, implements any one of the above methods for burning the address code of the LED lamp beads.

In one embodiment, the present disclosure provides a method for burning an address code of LED lamp beads, applied to a burner, and including:

ST601: the burner receives a temporary address code sent by the LED lamp bead;

ST602: the burner determines a permanent address code corresponding to the temporary address code and a burning instruction including the temporary address code and the permanent address code; and ST603: the burner sends the burning instruction to the LED lamp beads such that the LED lamp beads perform addressing according to the temporary address code and burn the permanent address code into the control chip of the LED lamp beads.

It should be noted that, in the embodiment, a function of the temporary address code is the same as that of the random code sent to the burner in the foregoing embodiment. Therefore, the method involved in the above embodiments, on the premise that no contradiction occurs, is also applicable to the embodiment. An advantage lies in that, when the LED lamp beads are damaged, the locations of the LED lamp beads may be quickly found according to the permanent address code. In addition, the address codes of the LED lamp beads may be arranged through the permanent address codes, so that the address codes are clearer in digital logic. When burning the address codes of the LED lamp beads, the temporary address codes sent by the LED lamp beads are received, then the burning instruction including the temporary address code and the permanent address code are confirmed, and the instruction is sent to the LED lamp beads, so that the LED lamp beads obtain the permanent address code according to the temporary address code and the permanent address code is into the LED lamp bead. When a lamp bead is damaged, the lamp bead may be replaced with any lamp bead of the same model and no requirement is raised for fixed locations of the lamp beads. Therefore, inconvenience in LED lamp bead maintenance caused by LED lamp beads at fixed locations is avoided, and one-by-one burning of the LED lamp beads in an LED lamp bead burning method is avoided, thus reducing working procedures.

On the basis of the method for burning the address code of the LED lamp beads disclosed in the foregoing embodiment, it can be found that the key lies in establishing communication between the burner and the LED. Then, to further expand the various burning methods disclosed in the present disclosure, a new universal method for burning the address code of the LED lamp beads may be revealed, including the following steps:

S001: communication is established between each LED unit in an LED lamp strip or another form of lamp bead array and a burner, and indication information is transmitted through the communication;

S002: an information receiver of the communication parses the indication information, and determines an address code to be burnt for each LED lamp bead according to the parsed indication information, where the address code is a temporary address code or a permanent address code, and the information receiver of the communication is the burner or each LED unit; and S003: the burner burns the address code to each LED lamp bead in batch.

Further, in another embodiment, the communication established in step S001 includes optical communication, or communication of other types different from the optical communication;

and, when the communication established between the burner and each LED unit is the optical communication, each LED unit includes the LED lamp beads, and the LED lamp beads have an ability to sense an optical signal; and when the communication established between the burner and each LED unit is the communication of the other types different from the optical communication, each LED unit further includes a communication unit connected to the LED lamp beads in addition to the LED lamp beads, and the communication unit has an ability as the information receiver or an information sender.

For the two embodiments described here, there are two situations as follows:

1) when the communication is based on a light-sensing ability of the LED lamp beads themselves, the burner only needs to have a function of an information sender in the optical communication; and because the LED itself emits light, the LED itself may also be used as an information sender in optical communication. At the moment, the burner only needs to receive the light and parse the indication information; and 2) when the communication does not depend on the LED lamp beads themselves, the communication depends on the burner and a communication unit in the LED unit. The communication unit may either have an ability to receive signals or an ability to send signals. For example, when the communication unit has the ability to receive the signals, i.e., the communication unit is a LAN network card IC or a wireless network card IC or a Bluetooth IC or other ICs with communication functions (such as Zigbee ICs, etc.), the burner may transmit the indication information by establishing a network connection with the network card IC, or may establish a Bluetooth connection with the Bluetooth IC through the Bluetooth protocol and transmit the indication information. Obviously, either the burner or the communication unit may be used as the information receiver of the communication, and when one side is the information receiver, the other side may be the information sender.

Further, in combination with the other burning methods described above, the two embodiments described here can naturally determine the address code to be burnt for each LED lamp bead according to the parsed indication information. The address code is a temporary address code or a permanent address code. By extension, in the foregoing of the two embodiments described here, the technical means disclosed in the foregoing other embodiments include random codes, temporary address codes, permanent address codes, identification codes, check codes, burning instructions, repeated code judgment, and peripheral circuit, which can all be used in the current embodiment.

Exemplarily, the indication information may be the random code. At the moment, each LED lamp bead may obtain the indication information to obtain a randomly generated random code;

the LED lamp beads send the random code to a burner so as to determine, in the burner, a permanent address code corresponding to the random code and a burning instruction including the random code and the permanent address code; and the LED lamp beads receive the burning instruction, perform addressing according to the random code, and store the permanent address code.

In one embodiment, as shown in FIG. 24, the LED lamp beads further include a random code generation circuit. The random code generation circuit includes a timer, a register, and a first oscillator and a second oscillator in different output frequencies. The first oscillator is connected to the register through the timer, and the second oscillator is connected to the register. Specifically, the first oscillator is connected to a first input end of the register through the timer, and the second oscillator is directly connected to a second input end of the register, so that the first oscillator may be used to time the second oscillator. The second oscillator generates a sequence, which is registered in a register, and because of randomness of the sequence, random code output may be generated accordingly.

In the embodiment, when the first oscillator is used to time the second oscillator, the second oscillator will generate a sequence, the sequence will be random due to a difference of output frequency between the first oscillator and the second oscillator. A true random code may be generated based on the sequence. The random code generation circuit may be used as a true random source in, for example, generation of the random codes of LED lamp beads. Since a control chip of each LED lamp bead in an LED array may generate a true random code based on this, no complex algorithm is needed, and a repetition rate of the random code corresponding to each LED lamp bead will be significantly reduced, which is conducive to improving an efficiency of burning the address codes of the LED lamp beads.

Preferably, the first oscillator is an RC oscillator, and the second oscillator is an inverting oscillator; or the first oscillator is an inverting oscillator, and the second oscillator is an RC oscillator. Specifically, output power of an oscillator is mainly affected by its processing parameters. In a process of CMOS circuit processing, processing of a MOS tube involves multiple process steps such as doping, CVD and photolithography, and a processing technology of the resistor is obviously different from that of the MOS tube, so process parameters of the resistor and process parameters of the MOS tube will also be certainly different. The deviation may reach about ±20%, and it is relatively random. Therefore, the output frequency of the RC oscillator and the inverting oscillator will be different due to the difference in the processing parameters of the two, and the degree of the difference is relatively random. At the moment, if the RC oscillator is used to time the inverting oscillator, or the inverting oscillator is used to time the RC oscillator, a random sequence will be generated. Since the random sequence is affected by the processing parameters of components, it may be considered as a true random number, and a repetition rate between the random codes respectively generated by the multiple random code generation circuits is extremely low.

In a preferred embodiment, due to difference of processing parameters, the output frequency of the RC oscillator and that of the inverting oscillator will be randomly different. In view of this, the random code generation circuit may become a true random source, and a value generated each time has a certain degree of randomness, and a probability of repetition is extremely low.

Preferably, as shown in FIG. 26, the RC oscillator includes a capacitor, a resistor, and four inverters connected to one another in sequence. Two ends of the capacitor are respectively connected to an input end of the first inverter and an output end of the second inverter, and two ends of the resistor are respectively connected to the input end of the first inverter and an output end of the third inverter. Specifically, the four inverters INV are connected in sequence, that is, the output end of the first inverter is connected to the input end of the second inverter, the output end of the second inverter is connected to the input end of the third inverter, and the output end of the third inverter is connected with the input end of the fourth inverter; and the input end of the first inverter is used as the input end of the RC oscillator, and the output end of the fourth inverter is used as the input end CK1 of the RC oscillator. In the meantime, the two ends of the capacitor are respectively connected to the input end of the first inverter and the output end of the second inverter, and two ends of the resistor are respectively connected to the input end of the first inverter and the output end of the third inverter.

In a preferred embodiment, an oscillator may be prepared by an inverter, a resistor and a capacitor, and may be integrated in an integrated circuit such as a chip, thereby effectively reducing a volume of the oscillator and expanding its scope of application.

Preferably, as shown in FIG. 27, the inverting oscillator includes four inverters connected to one another in sequence, and an input end of the first inverter is connected to an output end of the third inverter. Specifically, the four inverters INV are connected in sequence, that is, the output end of the first inverter is connected to the input end of the second inverter, the output end of the second inverter is connected to the input end of the third inverter, and the output end of the third inverter is connected to the input end of the fourth inverter; and the input end of the first inverter is used as the input end of the inverting oscillator, and the output end of the fourth inverter is used as the output end CK2 of the inverting oscillator.

In a preferred embodiment, an oscillator may be prepared by the inverters, and may be integrated in an integrated circuit such as a chip, thereby effectively reducing a volume of the oscillator and expanding its scope of application.

Preferably, as shown in FIG. 28, each inverter includes a first transistor and a second transistor. A source electrode of the first transistor is connected to a power source, a source electrode of the second transistor is grounded, a gate electrode of the first transistor and a gate electrode of the second transistor are connected as the input end of the inverter, and a drain electrode of the first transistor and a drain electrode of the second transistor are connected as the output end of the inverter. Specifically, the first transistors may be selected from P-type transistors, the second transistors may be selected from N-type transistors and the inverters may be prepared merely by introducing the first transistors and the second transistors into power source ends and grounding ends. At the moment, a specific structure of the RC oscillator is as shown in FIG. 29, and a specific structure of the inverting oscillator is as shown in FIG. 30.

In a preferred embodiment, the inverters may be integrated in integrated circuits such as chips through the transistors, and then the oscillators and random code generation circuits are directly generated in the chips, which may be improved on the basis of existing chips, without building additional devices, so use is simple and efficient, and a manufacturing cost is low.

Preferably, as shown in FIG. 25, the random code generation circuit also includes a low-order register, and the low-order register is connected to the register. Specifically, because even if oscillators with different processing parameters are used, the difference between different oscillators will decrease with the improvement of processing accuracy, or, in other words, when the first oscillator is used to time the second oscillator, if binary sequences generated by a plurality of random code generation circuits are converted into decimal values respectively, the absolute difference between the decimal values is limited, so the difference needs to be amplified. The low-order register is used to take only the specific low-order bits of long binary sequences in the register as the random codes, which is equivalent to amplifying, thus effectively enhancing the degree of difference between the random codes.

For example, if a plurality of chips have the random code generation circuit of the embodiment, due to differences in processing parameters, the frequencies of the oscillators are different, and three chips are used for description. Among them: Chip 1: the frequency of the first oscillator is 1 MHz, the frequency of the second oscillator is 1.1 MHz, the first oscillator is used to count the time for 1 second, the count value of the second oscillator is 11011101111100100010, and lower 8-bit data taken is 00100010. Chip 2: the frequency of the first oscillator is 1 MHz, the frequency of the second oscillator is 1.2 MHz, the first oscillator is used to count the time for 1 second, the count value of the second oscillator is 11001011011100110101, and lower 8-bit data taken is 00110101. Chip 3: the frequency of the first oscillator is 1 MHz, the frequency of the second oscillator is 1.08 MHz, the first oscillator is used to count the time for 1 second, the count value of the second oscillator is 11100010000011100101, and lower 8-bit data taken is 11100101. The random codes generated by the random code generation circuits of the above three chips are completely different and may be used as their corresponding random codes.

In a preferred embodiment, due to the limitation of the production process, the frequency deviation of the oscillators between different chips is inevitable, so that data generated by the method of the random code generation circuit has randomness. It may be used as a true random source in, for example, generation of the random codes of LED lamp beads. Since a control chip of each LED lamp bead in an LED array may generate a true random code based on this, no complex algorithm is needed, and a repetition rate of the random code corresponding to each LED lamp bead will be significantly reduced, which is conducive to improving an efficiency of burning the address codes of the LED lamp beads.

As shown in FIG. 31, an embodiment of the present disclosure provides an LED control apparatus, including the above random code generation circuit.

Preferably, the LED control apparatus further includes a driving circuit configured to drive LED lamp beads. Specifically, the LED control apparatus may be in the form of an integrated circuit or a control chip embedded in the LED lamp beads. Since a traditional control chip can only control on/off of LED lamp beads to burn an address code of the LED lamp beads, random codes generated by the existing random code generation method has a high repetition rate, and a process of deduplication is increased. By using the above random code generation circuit, the control chip may not only control on/off of the LED lamp beads, but also quickly generate random codes with extremely low repetition rate, thus improving the burning efficiency of the address code of the LED lamp beads, and improving a dynamic display effect of an LED array.

Preferably, the LED control apparatus further includes a controller, and the controller is respectively connected with the random code generation circuit and the driving circuit. Specifically, since the LED control apparatus in the embodiment may be a chip in form, it accordingly includes a controller respectively connected to the random code generation circuit and the driving circuit.

More specifically, as shown in FIG. 32, the LED control apparatus may further include a coding/decoding circuit, an oscillator circuit and a current bias circuit. An input end of the coding/decoding circuit may serve as a signal input end DIN of the entire chip, one output end of the coding/decoding circuit may serve as a signal output end DOUT of the entire chip. However, it should be noted that, a part of control chips may not have an output end DOUT. In addition, the form of the control chip including DIN is a three-line structure, i.e. three lines including VDD, GND and DIN, or the control chip may be a two-line structure, i.e. two lines including VDD and GND. At the moment, there is no coding/decoding circuit, but a power supply demodulation circuit between the VDD terminal and the controller.

The control chip may further include three ports OUTR, OUTG and OUTB configured to be connected to different LED lamp beads respectively, three corresponding driving transistors, and a power source connecting port VDD and a grounding port GND.

It should be noted that, for the present disclosure, the methods for the controller to process the LED lamp bead driving information and to store the burnt address code information are all in the prior art, and will not be repeated here.

In a preferred embodiment, the LED control apparatus in the form of a chip is not only convenient for large-scale manufacturing, but also can effectively compress the volume of the corresponding equipment, further improving the effect of burning the LED control device.

Although the present disclosure is disclosed above, the present disclosure is not limited thereto. Any person skilled in the art can make various changes and modifications without departing from the spirit and scope of the present disclosure. Therefore, the protection scope of the present disclosure should be based on the scope defined by the claims.

What is claimed is:

1. A method for burning an address code of LED lamp beads, applied to a burner, and comprising the following steps:
    generating, by the burner, an optical signal; and
    sending the optical signal to the LED lamp beads such that the LED lamp beads sense the optical signal, so as to convert the optical signal into the address code and store the address code.

2. The method for burning the address code of the LED lamp beads according to claim 1, wherein the generating, by the burner, the optical signal comprises: obtaining, by the burner, an identification code, and converting the identification code into the optical signal, wherein a plurality of identification codes are provided, and the burner converts different identification codes into different optical signals, and sends the different optical signals to different LED lamp beads.

3. The method for burning the address code of the LED lamp beads according to claim 2, wherein after the burner generates the optical signal and sends the optical signal to the LED lamp beads such that the LED lamp beads convert the optical signal into the address code, the method further comprises: sending, by the burner, a check code to the LED lamp beads such that the LED lamp beads judge whether the address code is matched with the identification code according to the check code; and generating, by the burner, another optical signal under the condition that the address code is not matched with the identification code, and sending the optical signal to the LED lamp beads such that the LED lamp beads convert the optical signal into the address code and cover the previous address code.

4. The method for burning the address code of the LED lamp beads according to claim 2, wherein after the burner generates the optical signal and sends the optical signal to the LED lamp beads such that the LED lamp beads convert the optical signal into the address code, the method further comprises: obtaining, by the burner, the address code converted according to the optical signal by the LED lamp beads; matching, by the burner, the address code and the identification code; and generating, by the burner, another optical signal under the condition that the address code is not matched with the identification code, and sending the optical signal to the LED lamp beads such that the LED lamp beads convert the optical signal into the address code and cover the previous address code.

5. The method for burning the address code of the LED lamp beads according to claim 1, wherein the burner generates the optical signal and sends the optical signal to the LED lamp beads such that the LED lamp beads sense the optical signal and convert the optical signal into a temporary address code; and the burner generates a burning instruction comprising the temporary address code and a permanent address code corresponding to the temporary address code, and sends the burning instruction to the LED lamp beads such that the LED lamp beads perform addressing according to their own temporary address code and store the permanent address code.

6. The method for burning the address code of the LED lamp beads according to claim 1, further applied to the LED lamp beads and comprising the following steps: entering, by the LED lamp beads, an optical communication mode; sensing, by the LED lamp beads, the optical signal sent by the burner and converting the optical signal into the address code; and storing, by the LED lamp beads, the address code.

7. The method for burning the address code of the LED lamp beads according to claim 6, wherein after the optical signal is converted by the burner through an identification code, the method further comprises: receiving, by the LED lamp beads, a check code sent by the burner; judging, by the LED lamp beads, whether the address code is matched with the identification code according to the check code; and sensing, by the LED lamp beads, another optical signal sent by the burner under the condition that the address code is not matched with the identification code, converting the optical signal into the address code, and covering the previous address code with the converted address code.

8. The method for burning the address code of the LED lamp beads according to claim 6, wherein after the optical signal is converted by the burner through an identification code and the LED lamp beads convert the optical signal into the address code, the method further comprises: sending, by the LED lamp beads, the address code to the burner to judge whether the address code is matched with the identification code; and sensing, by the LED lamp beads, another optical signal sent by the burner under the condition that the address code is not matched with the identification code, converting the optical signal into the address code, and covering the previous address code with the converted address code.

9. The method for burning the address code of the LED lamp beads according to claim 6, wherein the LED lamp beads enter the optical communication mode, the LED lamp beads sense the optical signal sent by the burner and convert the optical signal into a temporary address code; and the LED lamp beads receive a burning instruction sent by the burner comprising the temporary address code and a permanent address code corresponding to the temporary address code, perform addressing according to a temporary address code of the LED lamp beads, and store the permanent address code.

10. A control apparatus for burning an address code of LED lamp beads, comprising a non-transitory computer-readable storage medium storing a computer program, wherein a program instruction, when being executed, implements the method for burning the address code of the LED lamp beads according to claim 1.

11. The control apparatus for burning the address code of the LED lamp beads according to claim 10, further comprising an LED control apparatus, wherein the LED control apparatus comprises a driving circuit configured to generate an LED lamp bead driving signal, an optical communication detection circuit configured to detect an optoelectronic signal generated by the LED lamp beads and a port configured to be connected to the LED lamp beads, and the driving circuit and the optical communication detection circuit are respectively connected to the port.

12. The control apparatus for burning the address code of the LED lamp beads according to claim 11, wherein the optical communication detection circuit comprises a first current mirror circuit, a second current mirror circuit and a comparator, an input end of the first current mirror circuit is connected to the port, an input end of the second current mirror circuit is configured to be connected to a reference current source, and an output end of the first current mirror circuit and an output end of the second current mirror circuit are both connected to the comparator.

13. The control apparatus for burning the address code of the LED lamp beads according to claim 12, wherein the first current mirror circuit comprises a first transistor and a second transistor, a drain electrode of the first transistor serves as the input end of the first current mirror circuit, a gate electrode of the second transistor is respectively connected to a gate electrode and the drain electrode of the first transistor, a source electrode of the first transistor and a source electrode of the second transistor are both connected to a power source, and a drain electrode of the second transistor serves as the output end of the first current mirror circuit; and the second current mirror circuit comprises a third transistor and a fourth transistor, a drain electrode of the third transistor serves as the input end of the second current mirror circuit, a gate electrode of the fourth transistor is respectively connected to a gate electrode and the drain electrode of the third transistor, a source electrode of the third transistor and a source electrode of the fourth transistor are both grounded, and a drain electrode of the fourth transistor serves as the output end of the second current mirror circuit.

14. The control apparatus for burning the address code of the LED lamp beads according to claim 11, wherein the optical communication detection circuit comprises a resistor and a comparator, a first end of the resistor is respectively connected to the port and a first input end of the comparator, a second end of the resistor is connected to a power source, and a second input end of the comparator is configured to be connected to a reference voltage source.

15. The control apparatus for burning the address code of the LED lamp beads according to claim 14, wherein the optical communication detection circuit further comprises a switching device, and the switching device is arranged between the port and the input end of the first current mirror circuit, or between the port and the first end of the resistor.

16. The control apparatus for burning the address code of the LED lamp beads according to claim 11, wherein the optical communication detection circuit comprises a resistor and an inverter, a first end of the resistor is respectively connected to the port and the inverter, and a second end of the resistor is connected to a power source.

17. A method for burning an address code of LED lamp beads, further applied to an array comprising a plurality of LED lamp beads, and comprising the following steps:
 obtaining, by each of the LED lamp beads, a randomly generated random code;
 sending, by the LED lamp beads, the random code to a burner so as to determine, in the burner, a permanent address code corresponding to the random code and a burning instruction comprising the random code and the permanent address code; and
 receiving, by the LED lamp beads, the burning instruction, performing addressing according to the random code, and storing the permanent address code.

18. The method for burning the address code of the LED lamp beads according to claim 17, wherein after each of the LED lamp beads obtains the randomly generated random code, the method further comprises:
 sending the random code to the burner, so as to perform repeated code judgment on all the random codes in the burner; and
 receiving, by the LED lamp beads, a repeated code instruction sent by the burner under the condition that repeated codes exist in all the random codes, and re-obtaining the random code according to the repeated code instruction.

19. A method for burning an address code of LED lamp beads, comprising the following steps:
 S001: establishing communication between each LED unit in an LED lamp strip or another form of lamp bead array and a burner, and transmitting indication information through the communication;
 S002: parsing, by an information receiver of the communication, the indication information, and determining an address code to be burnt for each LED lamp bead according to the parsed indication information, wherein the address code is a temporary address code or a permanent address code, and the information receiver of the communication is the burner or each LED unit; and
 S003: burning, by the burner, the address codes to each LED lamp bead in batch.

* * * * *